United States Patent
May et al.

(10) Patent No.: US 6,668,663 B2
(45) Date of Patent: Dec. 30, 2003

(54) METHOD AND APPARATUS TO DETERMINE FLOW RATE WITH THE INTRODUCTION OF AMBIENT AIR

(75) Inventors: David F. May, Columbus, IN (US);
Louis A. Krempel, Columbus, IN (US);
Angela R. May, Columbus, IN (US)

(73) Assignee: Analytical Engineering, Inc., Columbus, IN (US)

( * ) Notice: Subject to any disclaimer, the term of this patent is extended or adjusted under 35 U.S.C. 154(b) by 0 days.

(21) Appl. No.: 10/027,469

(22) Filed: Dec. 21, 2001

(65) Prior Publication Data
US 2002/0108451 A1 Aug. 15, 2002

Related U.S. Application Data

(60) Provisional application No. 60/258,384, filed on Dec. 27, 2000, provisional application No. 60/267,631, filed on Feb. 9, 2001, provisional application No. 60/269,629, filed on Feb. 15, 2001, provisional application No. 60/274,977, filed on Mar. 12, 2001, provisional application No. 60/292,180, filed on May 17, 2001, and provisional application No. 60/297,329, filed on Jun. 11, 2001.

(51) Int. Cl.$^7$ .............................................. G01F 1/704
(52) U.S. Cl. ................. 73/861.05; 73/861.95; 73/861.63
(58) Field of Search .................... 73/861.95, 861.05, 73/861.04, 861.63, 861.68, 204.21

(56) References Cited

U.S. PATENT DOCUMENTS

| | | | | |
|---|---|---|---|---|
| 4,418,568 A | * | 12/1983 | Surman | 73/118.2 |
| 4,941,778 A | * | 7/1990 | Lehmann | 73/861.04 |
| 5,473,947 A | * | 12/1995 | Buquet | 73/861.04 |
| 5,526,696 A | * | 6/1996 | Cappi | 73/861.04 |
| 5,533,549 A | * | 7/1996 | Sherman | 73/861.63 |
| 5,594,179 A | * | 1/1997 | Marsh | 73/861.07 |
| 5,719,341 A | * | 2/1998 | Reynolds et al. | 73/861.95 |
| 6,112,574 A | * | 9/2000 | Hirano et al. | 73/23.31 |

* cited by examiner

Primary Examiner—Harshad Patel
(74) Attorney, Agent, or Firm—Taylor & Aust, P.C.

(57) ABSTRACT

A method of determining a rate of flow of a first gas in a pipe includes placing a flow-restricting device in the pipe such that the device and/or the pipe define a first channel section and a second channel section. The second channel section is disposed downstream from the first channel section. The first channel section has a first cross-sectional area. The second channel section having a second cross-sectional area less than the first cross-sectional area. A source of a second gas is provided in fluid communication with the second channel section. A low pressure in the second channel section is caused by an increased flow velocity and creates a flow of the second gas into the second channel section. A rate of a flow of the second gas into said second channel section is measured. A mathematical relationship between the rate of the flow of the second gas into the second channel section and the rate of flow of the first gas in the pipe is ascertained. The rate of flow of the first gas in the pipe is calculated based at least partially upon the rate of flow of the second gas into the second channel section and the ascertained mathematical relationship.

40 Claims, 15 Drawing Sheets

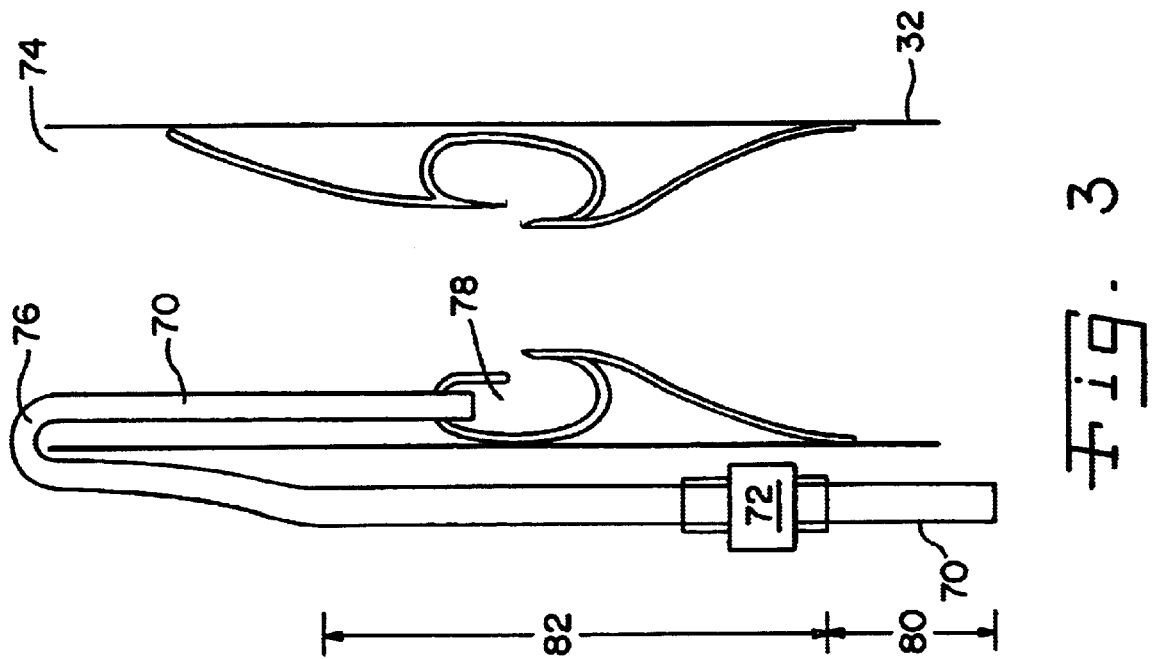
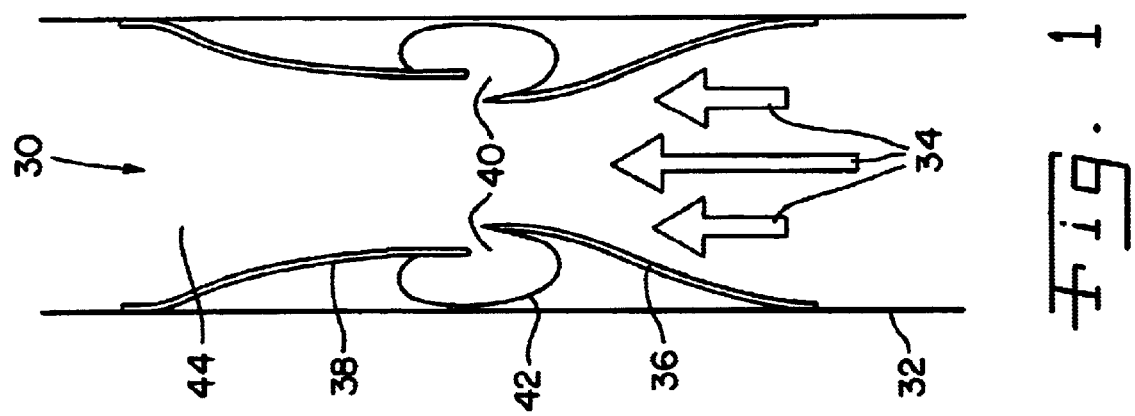

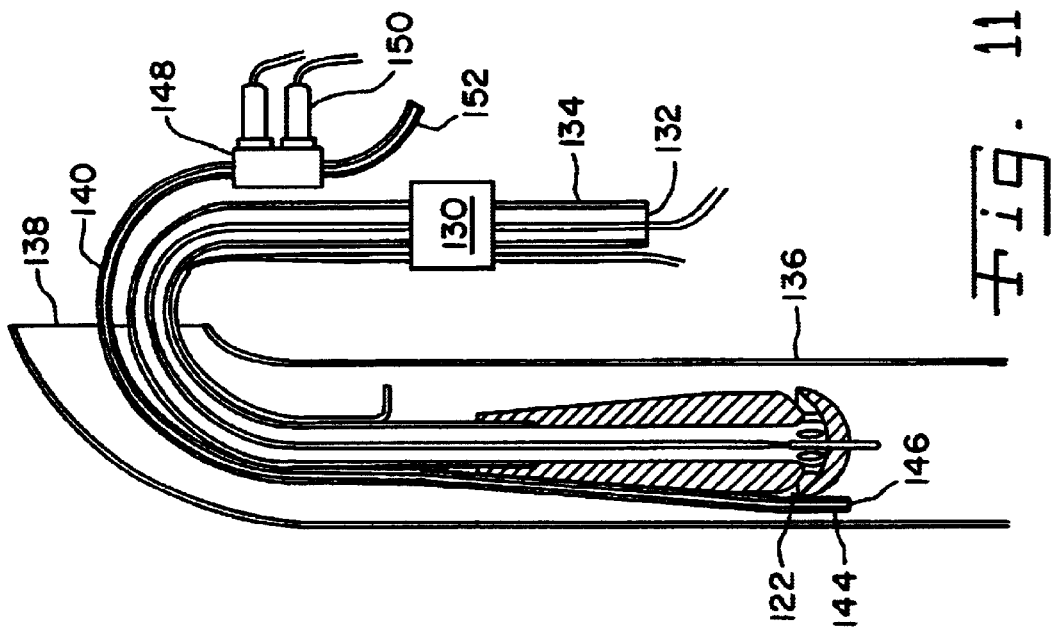
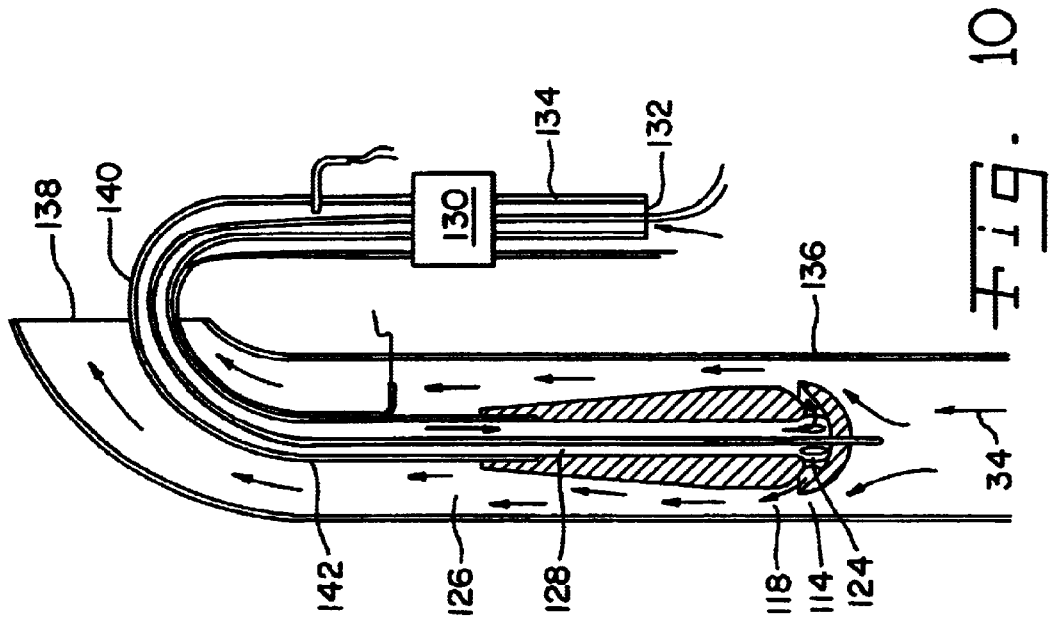

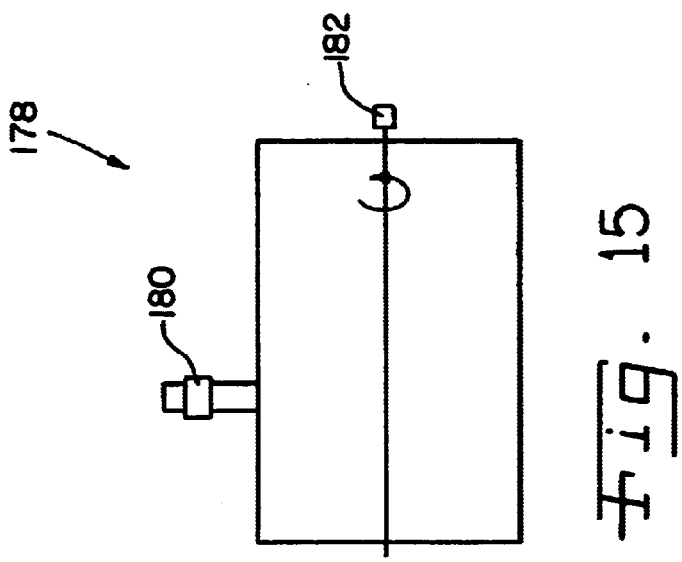
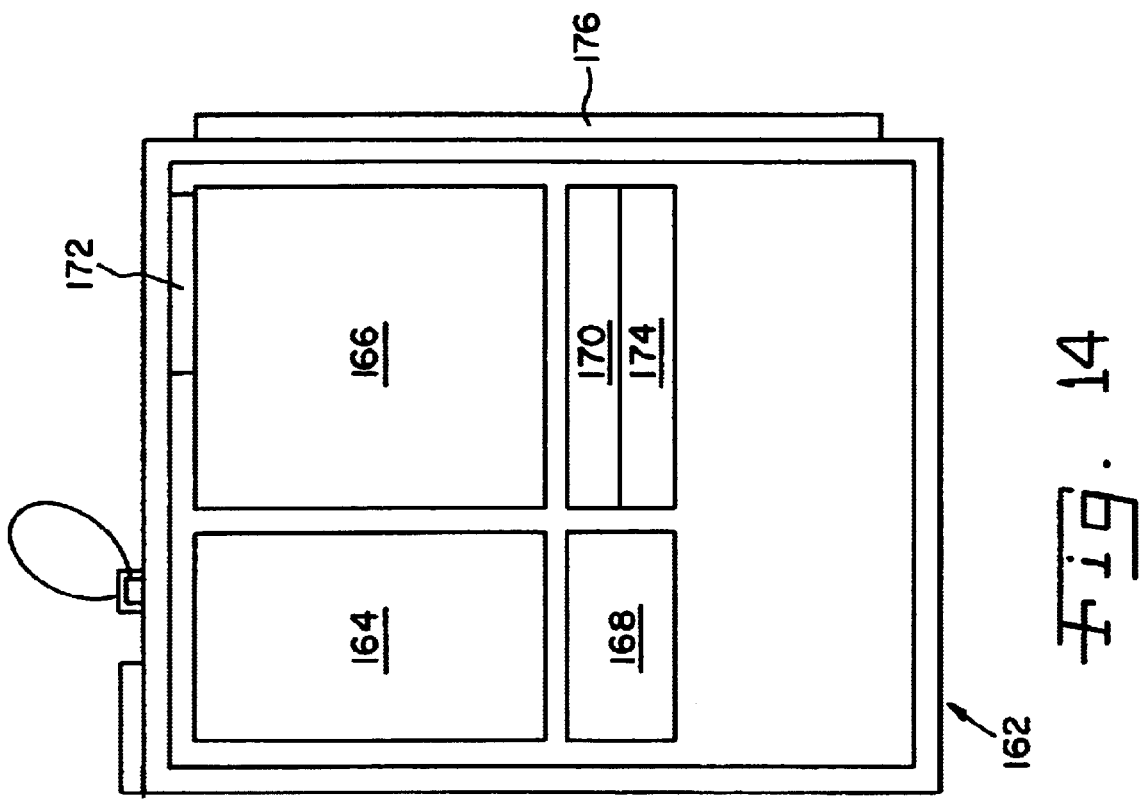

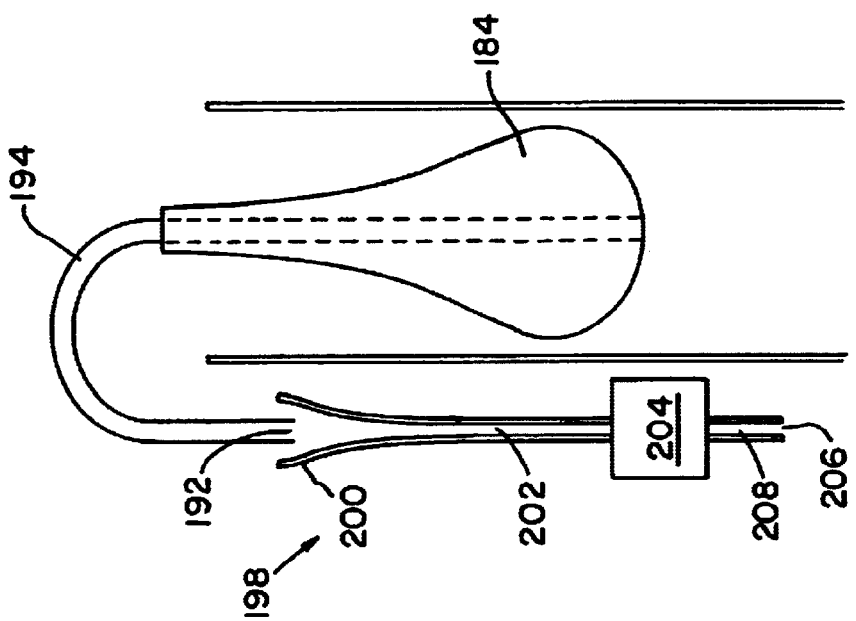
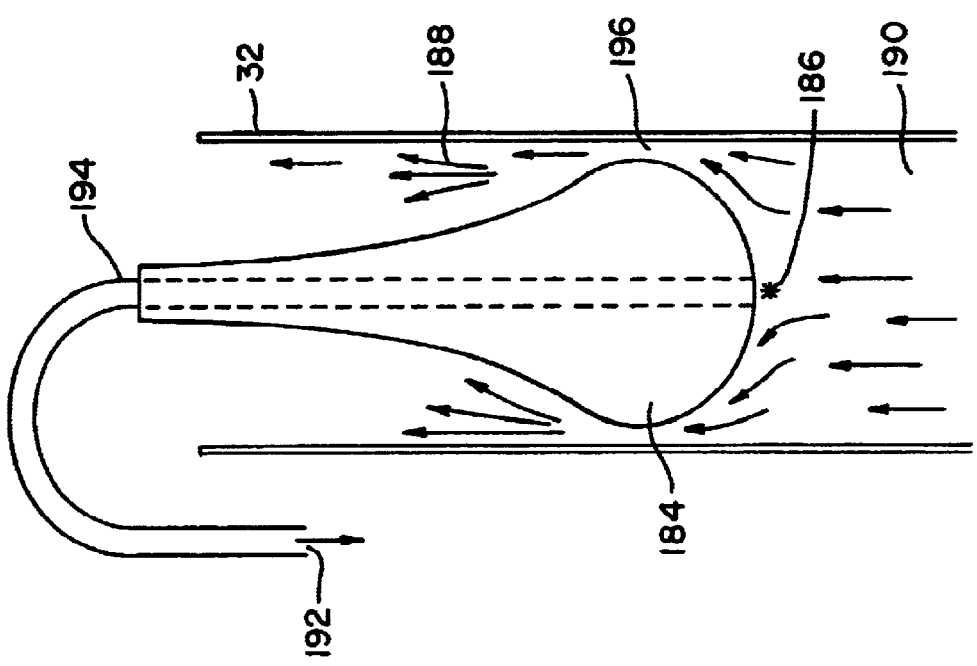

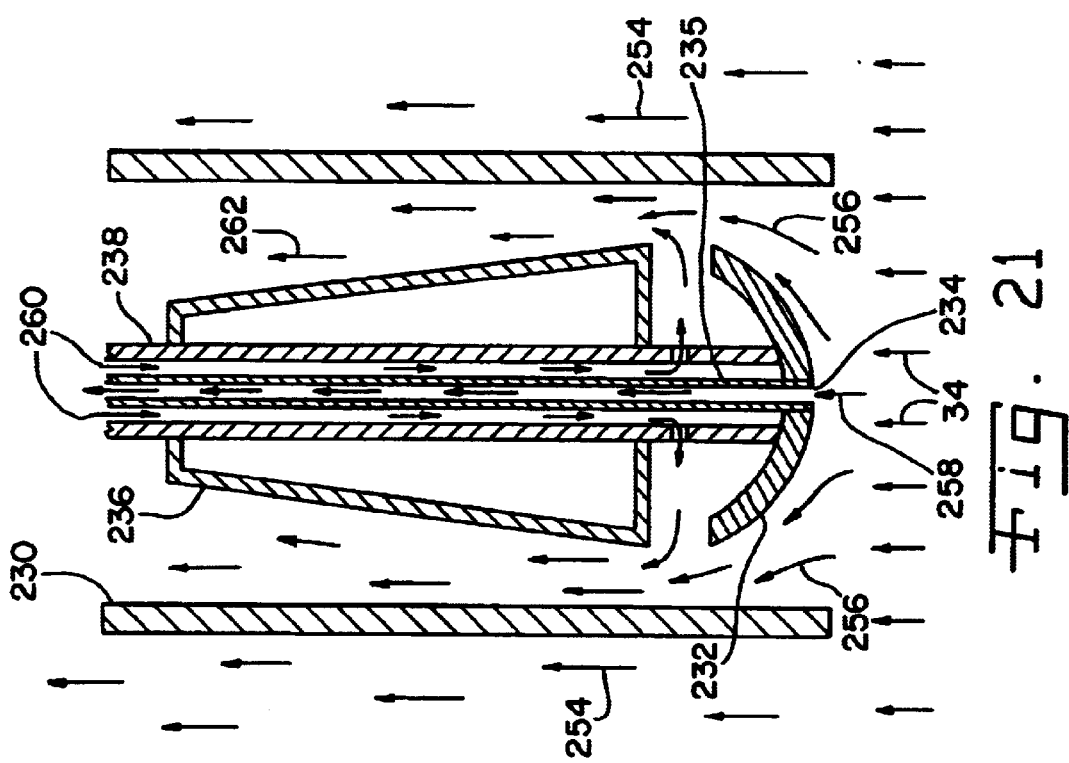
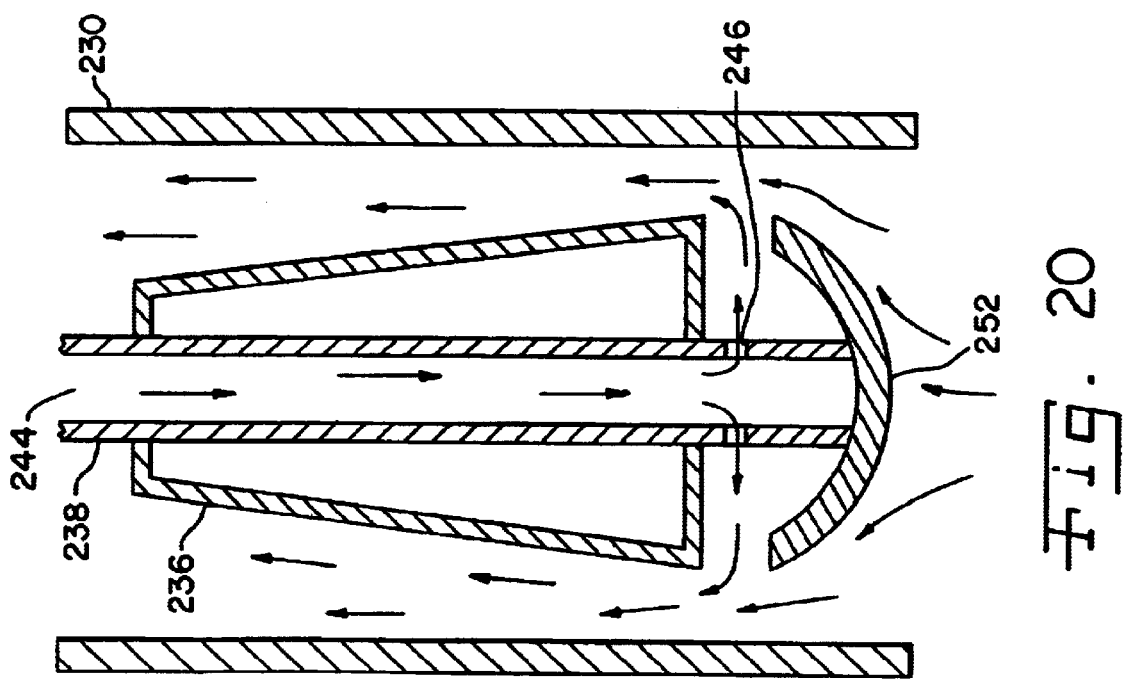

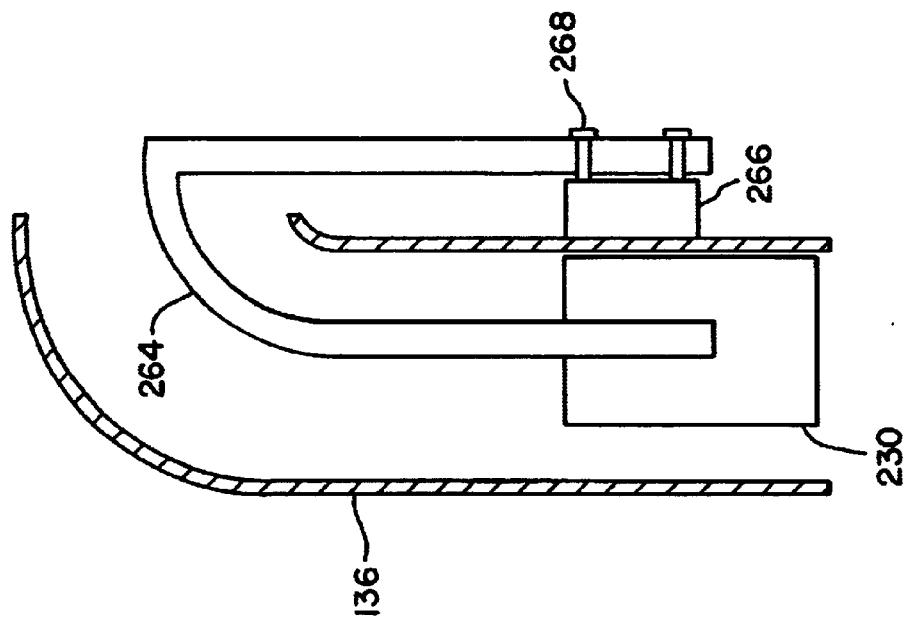
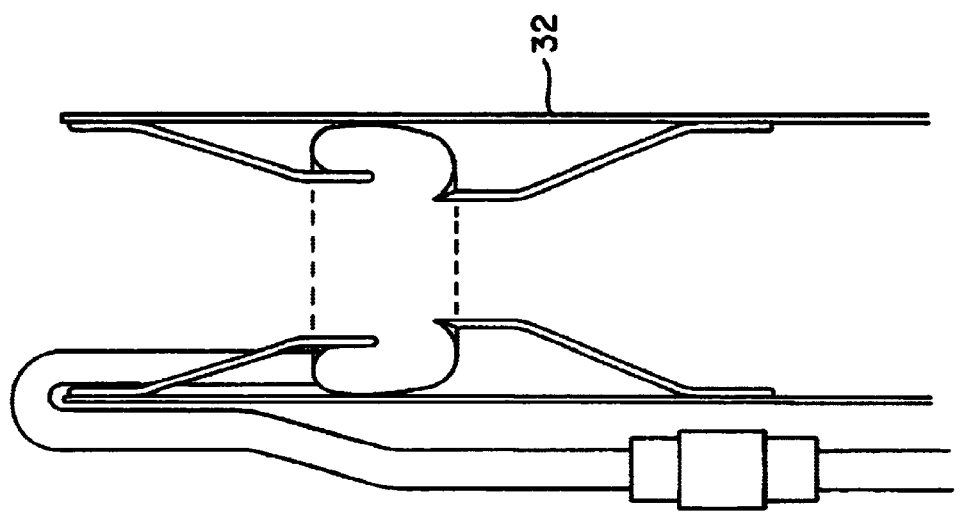

METHOD AND APPARATUS TO DETERMINE FLOW RATE WITH THE INTRODUCTION OF AMBIENT AIR

CROSS REFERENCE TO RELATED APPLICATIONS

This is a non-provisional patent application based upon U.S. Provisional Patent Application Serial No. 60/258,384, entitled "GASEOUS MASS FLOW MEASUREMENT SYSTEM", filed Dec. 27, 2000; U.S. Provisional Patent Application Serial No. 60/267,631, entitled "EXHAUST MASS FLOW MEASUREMENT SYSTEM FOR ON VEHICLE AND STATIONARY ENGINE APPLICATIONS", filed Feb. 9, 2001; U.S. Provisional Patent Application Serial No. 60/269,629, entitled "EXHAUST EMISSIONS SPECIATION, EXHAUST FLOW MEASUREMENT, PERFORMANCE AND TELEMETRY BASED MEASUREMENT SYSTEM FOR ON-ROAD AND NON-ROAD POWER PLANTS", filed Feb. 15, 2001; U.S. Provisional Patent Application Serial No. 60/274,977, entitled "GAS FLOW AMPLIFIER FOR ON-VEHICLE EMISSIONS SAMPLING WITH OPTIONAL INTEGRAL MEASUREMENT DEVICES", filed Mar. 12, 2001; U.S. Provisional Patent Application Serial No. 60/292,180, entitled "GASEOUS MASS FLOW RATE MEASUREMENT DEVICE WITH OPTIONAL INTEGRAL SAMPLING AND MOUNTING HARDWARE", filed May 17, 2001; and U.S. Provisional Patent Application Serial No. 60/297,329, entitled "VENTURI OR EDUCTOR BASED GASEOUS MASS FLOW RATE MEASUREMENT DEVICE WITH OPTIONAL INTEGRAL SAMPLING AND MOUNTING HARDWARE", filed Jun. 11, 2001.

BACKGROUND OF THE INVENTION

1. Field of the Invention

The present invention relates to a flow measurement device, and, more particularly, to a gaseous mass flow measurement device.

2. Description of the Related Art

Traditional ways to measure exhaust gas flow rate are either cumbersome or do not work very well. It is known to measure an exhaust gas flow rate by introducing a trace gas with a known concentration and flow rate into the stream to be measured and utilizing an analyzer to measure the final concentration.

In one known method of measuring an exhaust gas flow rate includes making dynamic and static pressure measurements. The difference in static and dynamic pressure corresponds to the velocity of the gas. By knowing the temperature, velocity, and cross-sectional area of the exhaust pipe, the mass flow rate can be calculated. Examples include pitot tube type devices. A problem with these devices is that the dynamic pressure is often very small and highly fluctuating due to pulses in the exhaust. The signal-to-noise ratio is bad, with the noise being generally much greater than the signal.

In another known method of measuring an exhaust gas flow rate, a trace gas is introduced into the stream at a known concentration. The downstream concentration is measured, and thereby the total exhaust flow can be calculated. A problem is that a sophisticated analyzer and cumbersome source of trace gas is required.

In another known method of measuring an exhaust gas flow rate, a hot wire anemometer is used only in clean gaseous flow mediums. If the hot wire becomes fouled through exhaust particle deposition or other cause, the resulting flow rate data is not valid.

Current exhaust flow measurement devices rely upon the use of gas pressure differentials created with pitot tube devices and or reduced pressures generated by vortexes generated around an obstruction in the flow path. These pressures, either relative to atmospheric, absolute or differential are measured with indicating devices such as pressure or differential pressure transducers. The nature of these measurement devices makes it nearly impossible to improve on accuracies better than +/−0.25% of span. For most engine exhaust mass flow measurement systems, there exist specific and stringent specifications for exhaust backpressure measured at the engine. If the exhaust system and any integrated exhaust measurement device together exceed these specifications, then it is deemed that this interference can degrade engine performance and disqualify the test results. In order to satisfy these requirements, generally exhaust pipe sizes are maintained at a size larger than necessary to carry the flow without unwanted restriction. By over-sizing the exhaust pipe, the resultant flow velocity is diminished. Generally, pitot or vortex based systems rely on this velocity to activate the generated pressure, reduced pressure or differential pressure. The small signal therefore generated by the transducer may be only incrementally larger than the noise generated due to the fundamental precision of the instrument. The result is poor signal to noise ratio and therefore poor precision in the overall exhaust mass flow. For all these systems, turbulence only worsens the backpressure.

Another problem with these types of systems is flow perturbation—or otherwise known in the industry as pulsation. Pulses in continuous flow, as would be generated by any reciprocating internal combustion engine, exist in the exhaust pipe. These pulses interact with pitot tube or vortex based systems in such a way that significant errors result. Because engine to engine and exhaust configurations differ greatly among vehicles, these errors cannot be corrected through assumption.

Another problem revolves around fouling. A principal reason why hot wire anemometer based flow measurement systems cannot be used in engine exhaust is particulate fouling. The solid matter, which exists in all engine exhaust eventually, deposits on the hot wire and changes the thermal transfer or electrical properties of the element, resulting in large errors. Correspondingly, pitot tube and even vortex based systems are also greatly affected by particulate fouling. The material impedes the flow of gas into the entrance and exit ports, thus resulting in errors that increase with time and additional fouling.

Another problem with these types of devices is the requirement to place very precise and therefore fragile measurement transducers near the exhaust exit port. The resultant vibration and thermal gradients experienced by the transducer often reduces the accuracy, introduces errors and can greatly detract from the inherent durability of the part.

Hot exhaust gas, by its very nature is a very difficult medium to quantify mass flow because traditional electronic sensors cannot tolerate the temperature, chemistry and/or particulate fouling. Several techniques are used for on-vehicle measurements including pitot tube, averaging anemometer, differential pressure flow measurement devices, etc. All of the existing devices for on-vehicle and most devices for stationary engine mass flow suffer from issues stemming from fouling, poor durability and/or poor precision as a result of one or more of the aforementioned conditions.

Power plant performance, emissions and hot exhaust gas flow are by their very nature very difficult media to quantify, even more so in actual field situations. Quantification is difficult due to the extremely harsh environments in which power plants such as on-road and off-road diesel and spark ignition engines operate. Due to the ever increasingly stringent world wide emissions regulations, it is becoming more and more important to have the capability to remotely measure and remotely monitor power plant performance parameters.

There are several reasons for measuring exhaust mass flow, including emissions monitoring, performance development, engine development and vehicle development to name a few. With the need to accurately measure emissions on a moving vehicle, it is becoming more important to accurately discern the exhaust mass flow. With these accurate and precise data, mass specific and more importantly, brake power specific emissions measurements can be made. With known methods, accurate and highly precise flow and performance measurements are impossible without huge, bulky and awkward instrumentation. This huge, bulky laboratory instrumentation does not lend itself to field, mobile power plant or vehicle testing.

Current systems capable of measuring emissions, power plant performance, duty-cycle monitoring, data storage and retrieval, and providing remote access via, but not limited to cellular networks are large, bulky, environmentally sensitive and require constant on-site engineering and technical support. Some of the current systems are so large that trailers must be towed behind the test article to support all of the measurement equipment. Current emissions measurement systems require daily and sometimes constant calibration and technical attention to acquire accurate data and measurement system uptime.

Many of the exhaust flow measurement techniques of the current systems are prone to fouling when operated in a diesel engine environment. The fouling of the current state of the art exhaust flow measurement device may take place in a relatively short period of time. In addition, the current systems may require "high level" and time-consuming instrumentation to measure all of the required engine performance parameters, such as torque, power, lubricating oil quality, intake air flow and fuel consumption. This "high level" of instrumentation is also typically very intrusive upon the test specimen, resulting in significant power plant downtime and reduced productivity. In summary, some of the current systems may require anywhere from one to several days for installation alone. The current emissions measurement systems are also more prone to failure since they were designed for a laboratory environment rather than a field environment.

What is needed in the art is a flow measurement device that is not affected by pulsations, is very robust and is in no way degraded by the corrosive elements, particulate matter, heat, and vibration associated with exhaust pipes and exhaust systems.

SUMMARY OF THE INVENTION

The present invention introduces a small flow of clean/fresh air into the main exhaust stream. A static pressure drop is created in the main exhaust stream by accelerating all or a portion of the exhaust flow, and the pressure is then recovered downstream. Using Bernoulli's principle, a tube is connected from the ambient clean atmosphere to the lower static pressure region inside the exhaust pipe. The pressure differential creates a flow of clean air into the exhaust pipe, to be entrained with the exhaust flow. The clean air flow rate is measured by a hot wire anemometer. This clean air flow rate directly corresponds to the total exhaust flow rate; therefore total exhaust flow can be determined by knowing the amount of fresh entrained air flow. Since the hot wire is only exposed to fresh air, it should never foul.

In another embodiment, the known temperatures of the exhaust, diluent, and combined flows are used rather than a hot wire. By knowing the specific heat of the gas, the flow rate can be calculated.

The present invention can be used to measure engine exhaust or any other gaseous flow stream wherein the introduction of a diluent flow is acceptable. The present invention may also be applied to measure the flow of factory processes for monitoring exhaust stacks and oil refineries.

The present invention provides a system to measure the undetermined flow rate of a gaseous stream, such as engine exhaust on a mobile or stationary vehicle or power plant. By introducing and combining a stream of a known flow rate and temperature with the second stream of unknown flow rate and known temperature, and measuring the change in temperature of the mixed and combined streams, the flow rate of the second stream can be accurately determined.

One embodiment of the mass flow measurement device of the present invention depends upon the large thermal gradient between exhaust gases and a diluent gas. By introducing a known mass flow of a cool diluent gas into the exhaust flow within the exhaust pipe, a temperature drop occurs in the exhaust. The extent of temperature drop is a function of the mass flow of the exhaust, temperature of the exhaust, mass flow of the diluent gas and temperature of the diluent gas. If complete mixing occurs without other outside thermal losses, the nature of these physical properties and the thermal characteristics of the exhaust and cool gas combination are well understood. Therefore, by measuring the temperature of both unmixed gases just before mixing, accurately measuring the mass flow of the diluent, and finally, accurately measuring the mixed gas temperature before it exits, the mass flow of the exhaust before mixing can be determined.

Because the temperature of a turbulent gas can be measured very accurately (less than 0.1 degrees Fahrenheit error), and because the mass flow of cool ambient air can be determined with excellent accuracy and precision over a very large range using hot wire or vortex shedding acoustic anemometers or both, the system depends only on good mixing.

The induction of the cool air is accomplished by entraining the diluent gas through the use of an eductor or ejector type device. The greater the flow rate of diluent, the more accurate the system becomes. By optimizing the eductor portion of the system to achieve the highest diluent flow rate and to maintain the overall exhaust backpressure below maximum specifications, a very reliable and accurate system is obtained.

Small ambient temperature mass flow measurement devices are inexpensive, accurate and provide very good durability. Resistance temperature devices (RTD's) or thermocouple temperature measurement probes are very responsive and accurate with excellent precision. By combining these accurate and precise measurement subsystems, the overall exhaust mass flow rate can be accurately and precisely determined over a very large range of flows.

Another embodiment of a mass flow measurement device of the present invention depends upon the induction of a diluent gas flow into the existing engine exhaust flow. By introducing a known mass flow of a diluent gas into the exhaust flow within the exhaust pipe, a quantitative correlation may be developed between the diluent mass flow and engine exhaust flow. The extent of diluent flow is a function of the mass flow of the exhaust, temperature of the exhaust and temperature of the diluent gas. It is not necessary for complete mixing of the diluent gas and exhaust gas to obtain a measurement of the diluent flow and subsequent exhaust flow. As a result the diluent flow is not significantly impacted by the nature of these physical properties and the thermal characteristics of the exhaust and cool gas combination are well understood. Therefore, by accurately measuring the mass flow of the diluent, and finally, correlating the diluent flow to the exhaust gas flow before it exits, the mass flow of the exhaust can be determined.

Because the mass flow of the diluent gas can be measured very accurately (less than 1% error), and because the mass flow of cool ambient air can be correlated via laboratory flow bench measurements to the exhaust flow with excellent accuracy and precision over a very large range using hot wire or vortex shedding acoustic anemometers or both, the system depends only on accurate on-board/laboratory measurement of the diluent flow.

The induction of the cool air is accomplished by entraining the diluent gas through the use of an eductor or ejector type device. The greater the flow rate of diluent, the more accurate the system becomes. By optimizing the eductor portion of the system to achieve the highest diluent flow rate and to maintain the overall exhaust backpressure below maximum specifications, a very reliable and accurate system is obtained.

In another embodiment, a highly mobile, telemetry based, unattended, environmentally sealed device measures and records the mass flow of power plant exhaust and intake air, power plant exhaust gaseous speciation and particulate matter quantification, power output, engine speed, fuel consumption, power plant lubricant quality, A/F ratio, performance, geographic location information (such as longitude, latitude, altitude and speed), travel routes, atmospheric conditions (such as but not limited to ambient pressure, ambient temperature and ambient relative humidity) and mobile vehicle as well as power plant performance on a mobile or stationary vehicle or power plant. The device may also be used for real time emissions and performance monitoring. The above-described measurement system is contained in a mobile environmental disclosure that lends itself to secure/antitheft attachment to the test specimen. The device also provides the user with the option of interfacing with and recording data from the power plant computer control module (if one exists) over a publicly available communication protocol.

The device is also capable of controlling the test specimen via data links (such as J1587/J1708/J1939). The device is capable of interpreting and interfacing with the power plant via the data link. The data acquired from the power plant emissions and performance measurement/monitoring devices is stored within an on-board data storage and acquisition system. The information is accessible both on-site and remotely via but not limited to cellular network and other communication devices. The emissions, performance and duty cycle analysis system once installed can be left unattended for extended periods of time, such as but not limited to several days to over a year.

The device is also capable of providing an extremely robust method of attachment to the power plant. A power plant is defined as any device or system that burns, combusts or consumes any type of hydrocarbon-based fuel.

The system may be utilized in the accurate measurement of any type of flowing gases, regardless of the size of the exhausting unit, possibly including but not limited to on-vehicle emissions for cars, trucks (both light and heavy), SUV's, off-road vehicles including snowmobiles, ATV's, dirt bikes, construction equipment, stationary and mobile power generation units, airplanes, helicopters, jets, personal water craft, boats, ships, outboard motors, lawnmowers, string trimmers, chain saws, leaf blowers, motorcycles, locomotives, furnaces, flow bench testing equipment, vehicle and engine test cells, heating and cooling ventilation systems, and industrial smokestacks of all types.

The measurement system can be used to help develop power plant preventive maintenance standards and intervals as well as power plant diagnostics.

There are several reasons for measuring exhaust mass flow, including emissions monitoring, performance development, engine development and vehicle development to name a few. With these accurate and precise data, mass specific and, more importantly, brake power specific emissions measurements can be made.

The output from the exhaust flow measurement device provides data relating to a wide variety of gaseous emissions, brake specific emissions and fuel consumption. The exhaust flow measurement and sampling device also provides a mechanism for speciation of the exhaust gas gaseous components as well as exhaust gas particulate matter.

The device of the present invention can be in the form of a module that is either placed partially inside an engine exhaust pipe or added to the end of an existing exhaust stack.

In yet another embodiment, an exhaust probe is used in conjunction with exhaust measurement devices for the measurement of particulate matter, hydrocarbons or other gaseous emitted species. The device is designed for direct placement into an exhaust stack. The shape of the device is such that, at the bottom, the exhaust gas pressure in the stagnation zone is significantly higher than the static pressure of the exhaust in the stack. By routing this unhindered through a tube outside of the stack to ambient air pressure, the maximum possible pressure differential is achieved. This results in the greatest possible flow through the tube without non-passive components such as pumps, ejectors etc.

In a further embodiment, a gaseous mass flow measurement device may be inserted in any type of gaseous flow stream, from clean air to a stream containing products of combustion, such as the exhaust pipe on an internal combustion engine. The flow measurement device contains an optional sampling port to take a small portion of the flow and redirect it to an analyzer to determine such things as particulate matter or unburned hydrocarbons. The measurement device entrains a flow of clean ambient air by creating a pressure differential between the main flow being measured and the ambient entrained flow. The clean ambient flow rate is determined with a hot wire anemometer, and is calibrated to the total flow through the pipe to be measured. The system has been designed such that the same flow measurement device will work on a wide range of pipe sizes. The system has also been designed so that it is relatively easy to mount on an exhaust pipe. The measurement device may be located eccentric relative to the exhaust pipe. The shape of the device is such that at the bottom, the exhaust gas pressure in the stagnation zone is significantly higher than the static pressure of the exhaust in the stack.

In a still further embodiment, a gaseous mass flow measurement device may be inserted in any type of gaseous flow stream, from clean air to a stream containing products of combustion, such as the exhaust pipe on an internal combustion engine. The flow measurement device contains an optional sampling port to take a small portion of the flow and redirect it to an analyzer to determine such things as NOx, $CO_2$, particulate matter or unburned hydrocarbons. The measurement device entrains a flow of clean ambient air by creating a pressure differential between the main flow being measured and the ambient entrained flow. The clean ambient flow rate is determined with a hot wire anemometer, and is calibrated to the total flow through the pipe to be measured.

The system is designed such that the same flow measurement device will work on a wide range of pipe sizes. The system is also designed so that it is relatively easy to mount on an exhaust pipe. The measurement device may be located eccentric relative to the exhaust pipe. The venturi or eductor accelerates the main flow stream by smoothly reducing the cross-sectional area. At the point where the main gaseous flow is traveling through the reduced cross-sectional area, referred to as the throat region, the total pressure is maintained while the static pressure is reduced due to an increase dynamic pressure caused by the increase in velocity. The pressure drop created at the throat region induces fresh ambient flow in through an opening at the throat which is connected to the fresh air. The downstream side from the throat is designed for pressure recovery. The measurement device may be used with full or partial exhaust flow.

The present invention may be employed on numerous different applications of a gas flowing through a pipe. The flowing gas can flow through an engine exhaust stack and be generated from an internal combustion engine. Throughout the following descriptions, the component creating the reduced pressure region will be referred to as a venturi. The word "eductor" may be substituted for the word venturi within any of these embodiments.

The invention comprises, in one form thereof, a method of determining a rate of flow of a first gas in a pipe. A flow-restricting device is placed in the pipe such that the device and/or the pipe define a first channel section and a second channel section. The second channel section is disposed downstream from the first channel section. The first channel section has a first cross-sectional area. The second channel section having a second cross-sectional area less than the first cross-sectional area. A source of a second gas is provided in fluid communication with the second channel section. A rate of a flow of the second gas into said second channel section is measured. A mathematical relationship between the rate of the flow of the second gas into the second channel section and the rate of flow of the first gas in the pipe is ascertained. The rate of flow of the first gas in the pipe is calculated based at least partially upon the rate of flow of the second gas into the second channel section and the ascertained mathematical relationship.

An advantage of the present invention is that the flow measurement device is not affected by pulsations, is very robust and is in no way degraded by the corrosive elements, particulate matter, heat, and vibration associated with exhaust pipes and exhaust systems.

Another advantage is that the relative size of the outer diameter of the flow module to the inner diameter of the exhaust pipe may or may not be similar. That is, the entire module does not need to fit tightly into the exhaust pipe. This attribute allows for the module to be sized smaller than the range of pipes expected to be encountered, thus providing increased ease of installation.

Yet another advantage is that the system is very precise and durable in that the flow measurement device does not get fouled by the exhaust.

A further advantage of the present invention is that it provides the greatest mass flow of exhaust gas through a tube that can be delivered to an external measurement device with the minimum generated unwanted backpressure in the exhaust stack.

A still further advantage of the present invention is that it provides an easily installed gaseous mass flow measurement device that can be utilized on an internal combustion engine without generating unacceptable backpressure.

Another advantage is that the flow device with the integral chemical analyzers can be easily, quickly and reliably inserted into a wide array of exhaust configurations without modifications such as cutting or adapting.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a side, sectional view of one embodiment of a gaseous mass flow measurement module of the present invention disposed within an exhaust pipe;

FIG. 3 is a side, sectional view of another embodiment of a gaseous mass flow measurement system of the present invention;

FIG. 10 is a side, sectional view of another embodiment of a gaseous mass flow measurement system of the present invention;

FIG. 11 is a side, sectional view of another embodiment of a gaseous mass flow measurement system of the present invention;

FIG. 14 is a block diagram of one embodiment of a data acquisition and analysis enclosure of the present invention;

FIG. 15 is a side view of one embodiment of an anemometer and speed pick-up of the present invention on an engine being tested;

FIG. 16 is a side, sectional view of another embodiment of a gaseous mass flow measurement module of the present invention disposed within an exhaust pipe;

FIG. 17 is a side, sectional view of another embodiment of a gaseous mass flow measurement system of the present invention;

FIG. 20 is a side, sectional view of another embodiment of a gaseous mass flow measurement module of the present invention;

FIG. 21 is an enlarged, side, sectional view of the gaseous mass flow measurement module of FIG. 19;

FIG. 27 is a side, sectional view of another embodiment of a gaseous mass flow measurement system of the present invention;

FIG. 28 is a side, sectional view of the mounting device of FIG. 25 attaching a cylindrical housing to an exhaust pipe with a curved bend.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 2:
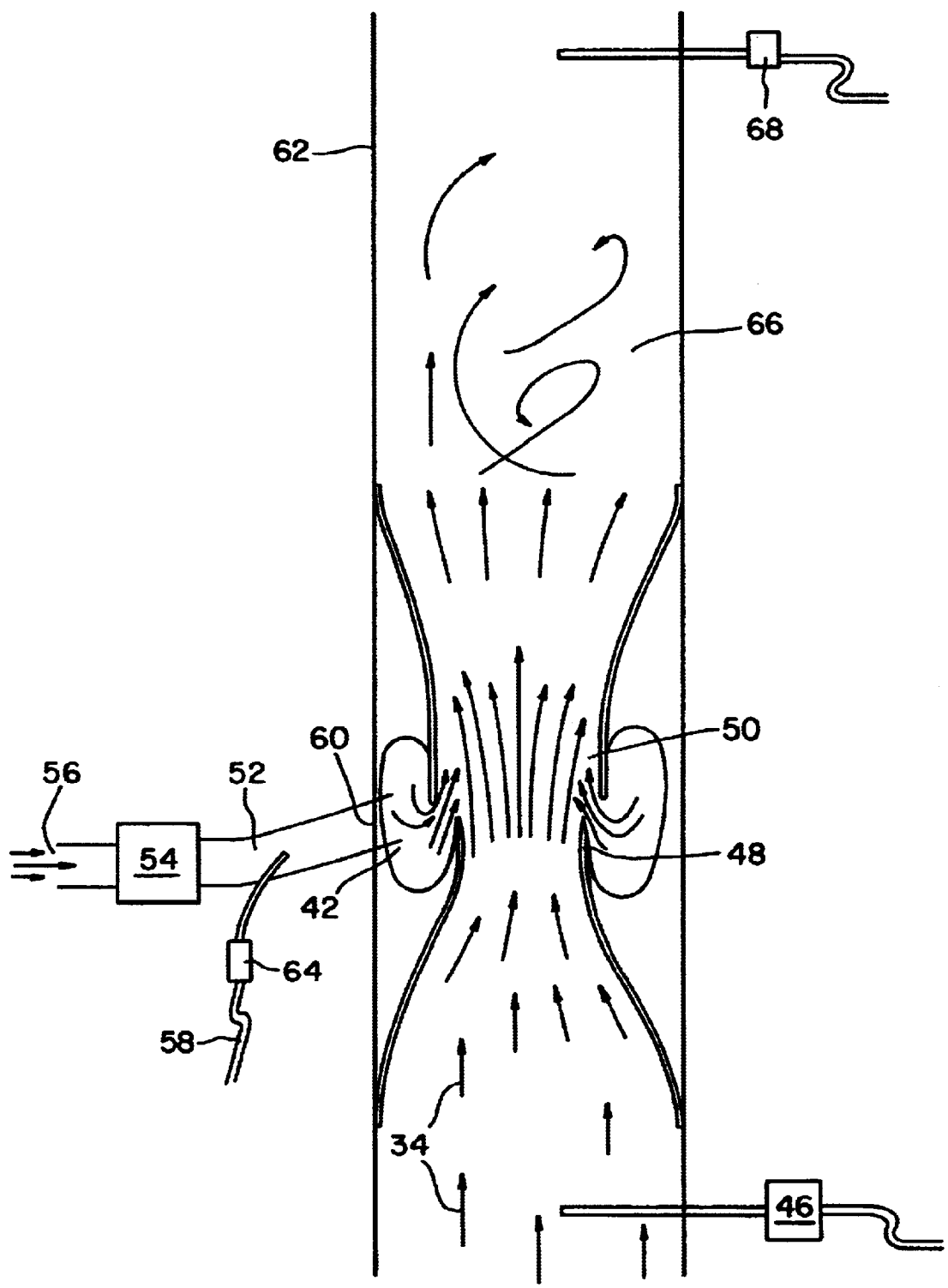
FIG. 2 is a side, sectional view of one embodiment of a gaseous mass flow measurement system of the present invention.

Referring now to the drawings and particularly to FIG. 1, there is shown one embodiment of a module 30 of the present invention. Flow-restricting module 30 is placed within an existing pipe 32. The exhaust gas, indicated by arrows 34, flows into an entrance of module 30. The entrance of module 30 has a relatively large cross-sectional area, and is referred to herein as a "first channel section". Gas 34 then enters a tapered restriction defined by a wall 36. When the constricted flow passes through the narrowest portion of wall 36, referred to herein as a "second channel section", it is delivered downstream into an expansion area defined by a wall 38. The second channel section has a cross-sectional area that is less than the cross-sectional area of the first channel section. The higher velocity resulting from the constriction of the flow in the second channel section creates a low pressure region at an opening 40 into the expansion area from a manifold 42. Manifold 42 and walls 36, 38 form an entrainment system or a type of eductor resulting in a flow of the gases in manifold 42 to the expansion area defined by wall 38. Manifold 42 is fluidly connected to a source of a second gas, such as ambient air. The flow of ambient air is entrained in exhaust 34 in the second channel section. Low pressure created by an increased flow velocity in the second channel section is utilized to draw the ambient air into the second channel section.

When exhaust gas 34 and the gases from manifold 42 combine, the combined and mixed gases expand into expansion region 44. Module 30 maximizes the entrained mass flow for all expected exhaust flow rates with a minimum exhaust restriction, and provides a maximum degree of mixing such that the exiting gas mixture is homogeneous. The air is in fluid communication with the second channel section through module 30.

In the embodiment of FIG. 2, engine exhaust 34 flows first past a temperature sensing device 46, which can be, for example, a thermocouple, resistance temperature device or thermistor disposed adjacent to the first channel section and/or upstream of the second channel section. For all temperature sensing devices in the system and for each location at which the temperature is sensed, one or more sensing devices, which may be the same type or different types, may be used. Exhaust flow 34 is constricted through a nozzle 48 and the above-described entrainment occurs in a mixing region 50.

The flow of the entrained gases from manifold 42 is fed from a plenum 52 after flowing through a mass flow sensor 54 and being originally fed through an entrance 56. One possible gas to flow into entrance 56 is ambient air. Mass flow sensor 54 measures a characteristic of the flow of air into manifold 42, such as a rate of flow. Mass flow sensor 54 can be a hot wire anemometer, hot wire mass flow meter, vortex shedding flow meter, laminar flow element, positive displacement meter, or any other type of gas flow meter.

Downstream of mass flow sensor 54 and preferably in a tube 58 immediately upstream of an entrance 60 of exhaust pipe 62 is disposed a temperature sensor 64. The combination of temperature and mass flow of the diluent gas provides the information for one side of the energy balance equation that will eventually render exhaust mass flow.

At mixing region 50, the majority of homogeneous mixing occurs with additional subsequent mixing occurring in a turbulent region 66. The final temperature downstream of turbulent region 66 is measured by a temperature sensor 68. It is possible to provide protruding mixing blades or another type or types of turbulators in turbulent region 66 to achieve the highest degree of homogenous mixing.

The rate of flow of exhaust 34 can be calculated based on the outputs of mass flow sensor 54 and temperature sensors 46, 64 and 68. Alternatively the rate of flow of exhaust 34 can be calculated based on the output of mass flow sensor 54 and a predetermined mathematical relationship therebetween.

In another embodiment (FIG. 3), a diluent flow tube 70 is oriented in a generally, but not limited to, parallel configuration to exhaust pipe 32. Tube 70 feeds into a mass flow meter 72 and further traverses toward an exit 74 of exhaust pipe 32 where a bend 76 redirects the diluent into the exhaust stack towards induction manifold 78. Bend 76 is shown to be approximately 180 degrees, but may range from 1 degree to 359 degrees depending on the system requirements. Tube 70 can be either thermally insulated or not depending on the location of the diluent induction temperature sensor. This configuration allows for the entire system to effectively "hug" the exhaust stack such that it is minimally intrusive. This configuration also allows the mass flow sensor, temperature sensors, etc. to be closely and securely attached to the stack, thus providing protection and stability.

Distance 80 and distance 82 are representative of the lengths of tube 70 upstream and downstream, respectively, of mass flow sensor 72. Generally these lengths are between 5 and 10 times greater than the diameter of pipe 70, thus ensuring homogenous flow distribution at sensor 72. A flow straightener such as honeycomb or other laminizers may be present upstream of flow sensor 72.

Figure 4:
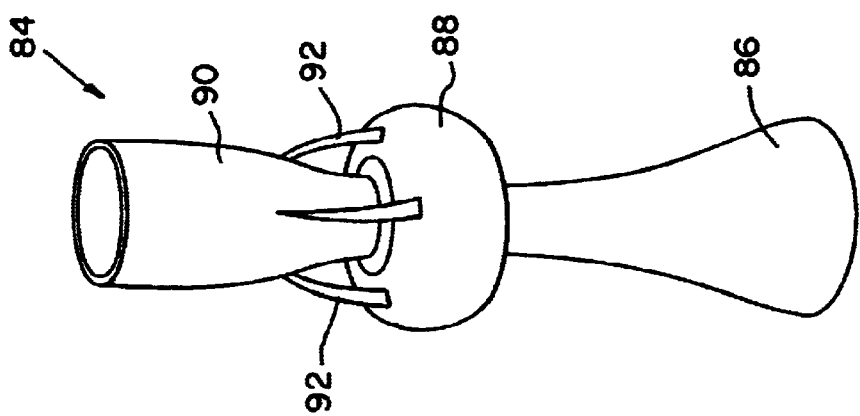
FIG. 4 is a perspective view of another embodiment of a gaseous mass flow measurement module of the present invention.

In another embodiment (FIG. 4), a unit 84 is either placed into an existing exhaust pipe, tube or plenum, either cylindrical or rectangular in shape, and the exhaust flow enters into an initial section 86 where it is constricted. The accelerated flow then passes by a manifold 88 and expands into latter section 90 where entrainment of gases from manifold 88 occurs. Manifold 88 is shown in an annular configuration, but could also be a multi-port or staged entrainment delivery system. Mechanical affixations such as supports 92 secure section 90 to section 88, but other attachment methods could be used.

Figure 5:
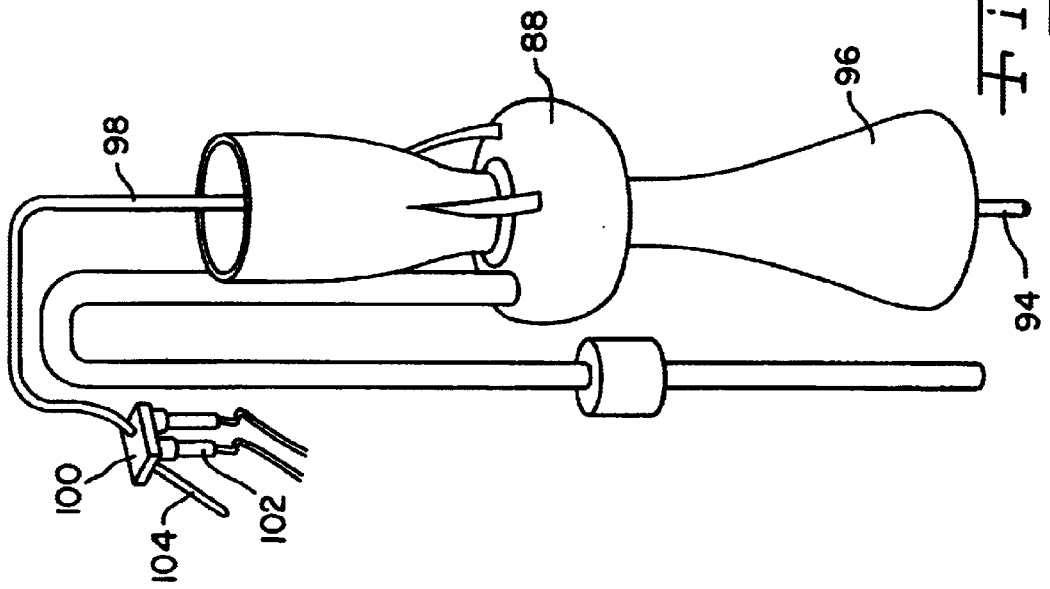
FIG. 5 is a perspective view of another embodiment of a gaseous mass flow measurement system of the present invention.

FIG. 5 illustrates a similar embodiment with the addition of a tube 94. Because dilution of the exhaust will affect chemical measurements of the raw exhaust, sampling must be done upstream of any dilution. Tube 94 protrudes below constriction 96 where impingement into the tube opening occurs with the raw exhaust gas. The exact location of the tubular opening may be closer or farther from the entrainment section. The raw exhaust flows through tube 98 and eventually flows into a sensor module adapter 100 whereby the chemical or physical properties of the raw gas are determined with at least one sensor 102. Finally, the flow of the raw gas exits from a tube 104. Geometry and size of tube 104 are such that ambient airflow into tube 104 is prevented, which could cause an interaction with sensors 102 and create a corresponding measurement error. The exit of tube 104 can be directed toward the rear of a vehicle such that ram air from the vehicle does not flow into tube 104, but instead creates a low pressure region at the outlet of tube 104. This further enhances gas movement from tube 94, through the system, and out tube 104.

Figure 7:
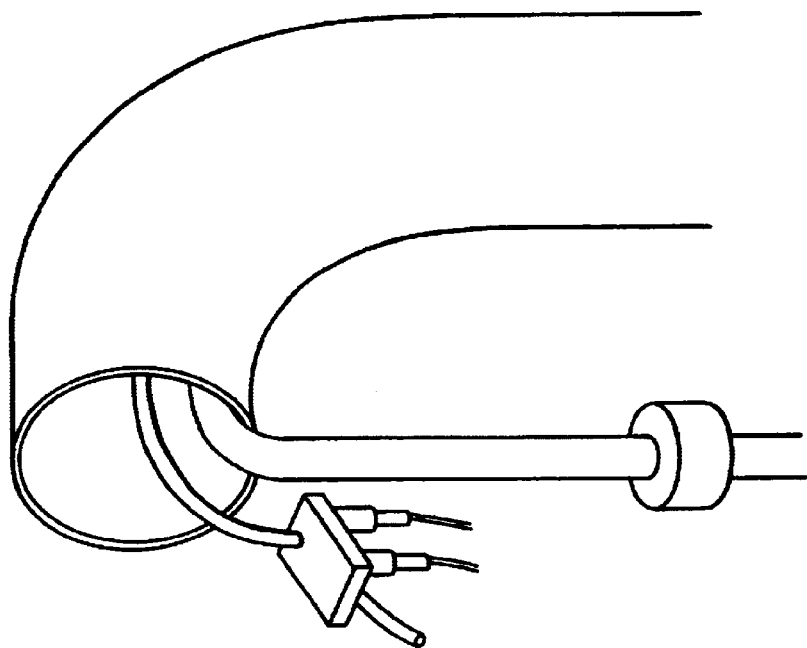
FIG. 7 is a perspective view of a drop-in system in a vehicle exhaust with an exit bend.
Figure 6:
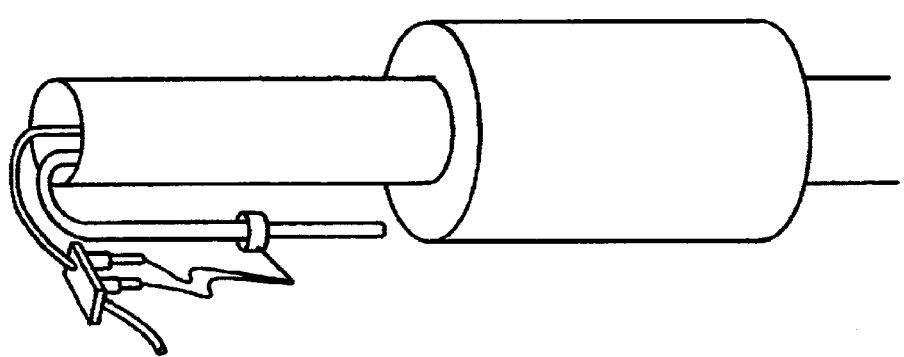
FIG. 6 is a perspective view of a drop-in system in a vehicle exhaust with an integral muffler.

FIG. 6 illustrates the use of the drop-in system in a vehicle exhaust with an integral muffler. FIG. 7 illustrates the use of the drop-in system in a vehicle exhaust with an exit bend.

Figure 8:
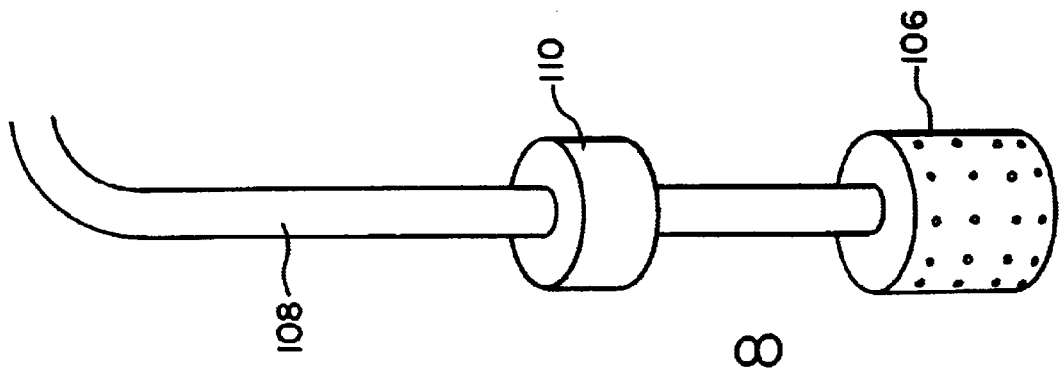
FIG. 8 is a perspective view of one embodiment of a filter and sensor module of the present invention.

In another embodiment (FIG. 8), a filter element 106 is added to an entrainment intake tube 108 upstream of mass flow sensor module 110.

It is also possible to use a water induction system instead of a diluent air induction system. This would allow for a very small amount of water to be introduced into the mixing region whereby the water is subsequently evaporated and the water vapor mixes with the exhaust. The advantage of this is that a small, positive displacement pump could be used to meter the water into the exhaust. The water induction rate can be varied with feedback from the exit temperature sensor, thus possibly greater control and accuracy can be obtained. Another advantage of this option is that water evaporation requires significantly greater energy per unit mass than that required to heat air, thus very little water would be required to achieve the measurement. Another advantage is that with this type of induction system, a constriction is not required for entrainment, thus exhaust restrictions can be minimized.

Figure 9:
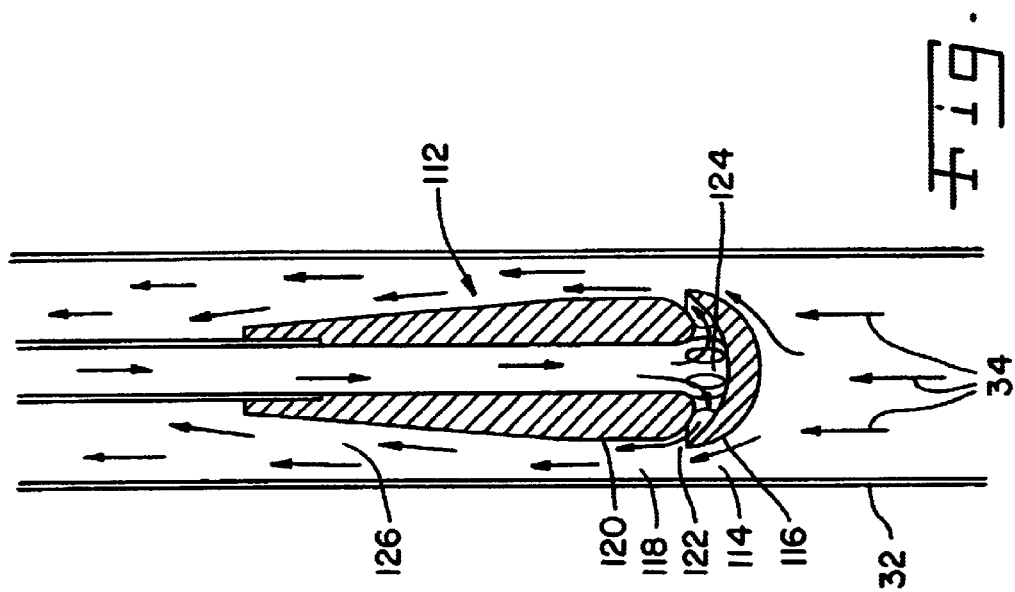
FIG. 9 is a side, sectional view of another embodiment of a gaseous mass flow measurement module of the present invention disposed within an exhaust pipe.

In another embodiment (FIG. 9), a module 112 is placed either within an existing pipe 32 or an add-on module. The flow of the exhaust gas, as indicated by arrows 34, enters a tapered annular restriction 114 defined by pipe 32 and a head 116 of module 112. When the constricted flow passes through the narrowest portion of annular restriction 114, it accelerates into a mixing region 118 of constant cross-sectional area defined by pipe 32 and body 120 of module 112. The higher velocity creates a low-pressure region at an opening 122 into mixing region 118, resulting in diluent flow from the contents of a manifold 124. An entrainment system or a type of eductor results in diluent flow from the gases in manifold 124. The flow rate of the diluent gases in manifold 124 is a function of exhaust gas flow 34. When the gases from the exhaust and the gases from manifold 124 combine, the combined and mixed gases expand into expansion region 126. Module 112 and pipe 32 form an entrainment system or a type of eductor resulting in a flow of the gases in manifold 124 to expansion region 126. Module 112 maximizes the entrained mass flow for all expected exhaust flow rates with a minimum exhaust restriction, and provides a maximum degree of mixing such that the exiting gas mixture is homogeneous. This provides the highest level of diluent gas entrainment and the maximum achievable measurement accuracy of the diluent gas, resulting in an excellent and highly capable exhaust flow measurement system.

In another embodiment (FIG. 10), the exhaust 34 from the engine flows first past the stagnation point of the exhaust flow measurement device. The exhaust flow is constricted through annular restriction 114 and the above-described entrainment occurs in mixing region 118. The flow of the entrained gases from manifold 124 is fed from a plenum 128 after flowing through a mass flow sensor 130 and being originally fed through an entrance 132. One possible gas to flow into entrance 132 is ambient air. Diluent mass flow sensor 130 can be a hot wire anemometer, hot wire mass flow meter, vortex shedding flow meter, laminar flow element, positive displacement meter or any other type of gas flow meter.

The measurement of the diluent mass flow gas provides the information that eventually renders exhaust mass flow. At mixing region 118, the majority of homogeneous mixing occurs with additional subsequent mixing occurring in expansion region 126. Expansion region 126 may contain protruding mixing blades or another type or types of turbulators to achieve the highest degree of homogenous mixing.

Diluent flow tube 134 is oriented in a generally, but not limited to, parallel configuration to exhaust pipe 136. Tube 134 feeds into the mass flow meter 130 and further traverses toward an exit 138 of exhaust pipe 136 where a bend 140 redirects the diluent into exhaust stack 136 towards induction manifold 124. Bend 140 is shown to have a turn of approximately 180 degrees, but the turn may range from 1 degree to 359 degrees depending on the system requirements. Central tube 142 fluidly connects manifold 124 and the source of ambient air in the form of entrance 132. Tube 142 can be either thermally insulated or not depending on the location of the diluent induction temperature sensor location. This configuration allows the entire system to effectively "hug" the exhaust stack such that it is minimally intrusive. This configuration also allows the mass flow sensor, temperature sensors, etc. to be closely and securely attached to the stack, thus providing protection and stability.

FIG. 11 illustrates a similar embodiment with the addition of a tube 144. Because dilution of the exhaust affects chemical measurements of the raw exhaust, sampling must be done upstream of any dilution. Tube 144 protrudes below opening 122 where the raw exhaust gas flows into a mouth 146 of tube 144. The exact location of tubular opening 146 may be higher or lower than shown in FIG. 11. The raw exhaust flows through tube 144 and eventually flows into a sensor module adapter 148 whereby the chemical or physical properties of the raw gas are determined with at least one sensor 150. Finally, the flow of the raw gas exits from tube 152. Geometry and size of tube 152 are such that ambient airflow into tube 152 is prevented, which could cause an interaction with sensors 150 and create a corresponding measurement error. The exit of tube 152 can be directed toward the rear of a vehicle such that ram air from the vehicle does not flow into tube 152, but instead creates a low pressure region at the outlet of tube 152. This further enhances gas movement from tube 144, through the system, and out tube 152.

Figure 12:
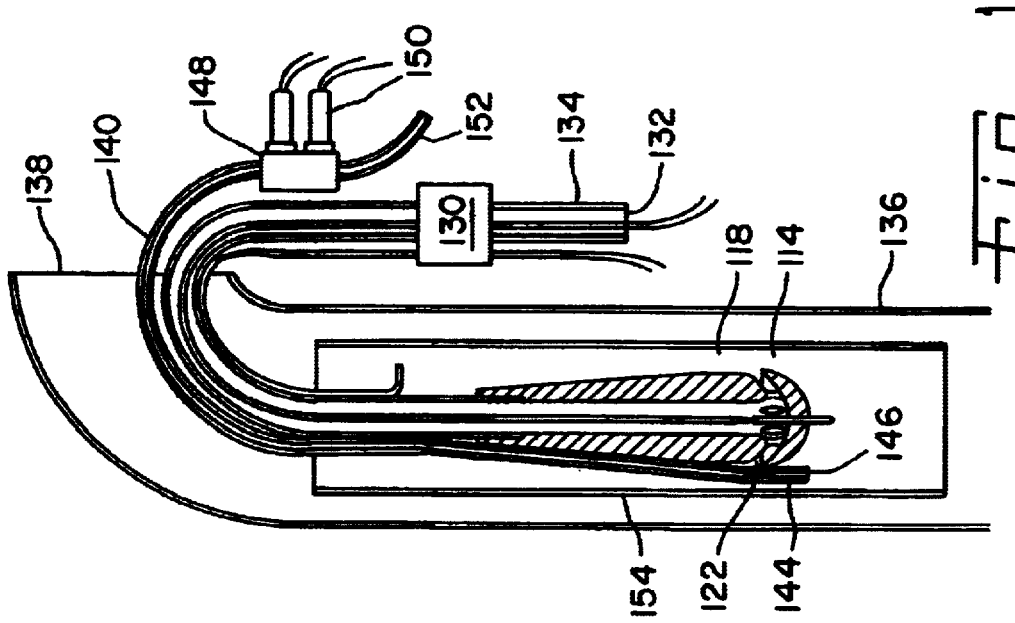
FIG. 12 is a side, sectional view of another embodiment of a gaseous mass flow measurement system of the present invention.

FIG. 12 illustrates a similar embodiment with the addition of a housing tube 154 surrounding the module. Housing tube 154 maintains a consistent concentricity and cross-sectional area of annular restriction 114 and mixing region 118, thereby maintaining consistent and controllable dilution rate and mixing, and providing the highest achievable exhaust mass flow measurement accuracy. Housing tube 154 also protects the ejector or eductor device during installation and removal from an exhaust pipe. Because only the portion of the total flow that passes through housing tube 154 is being measured, this embodiment requires calibration or scaling for different size exhaust pipes.

Figure 13:
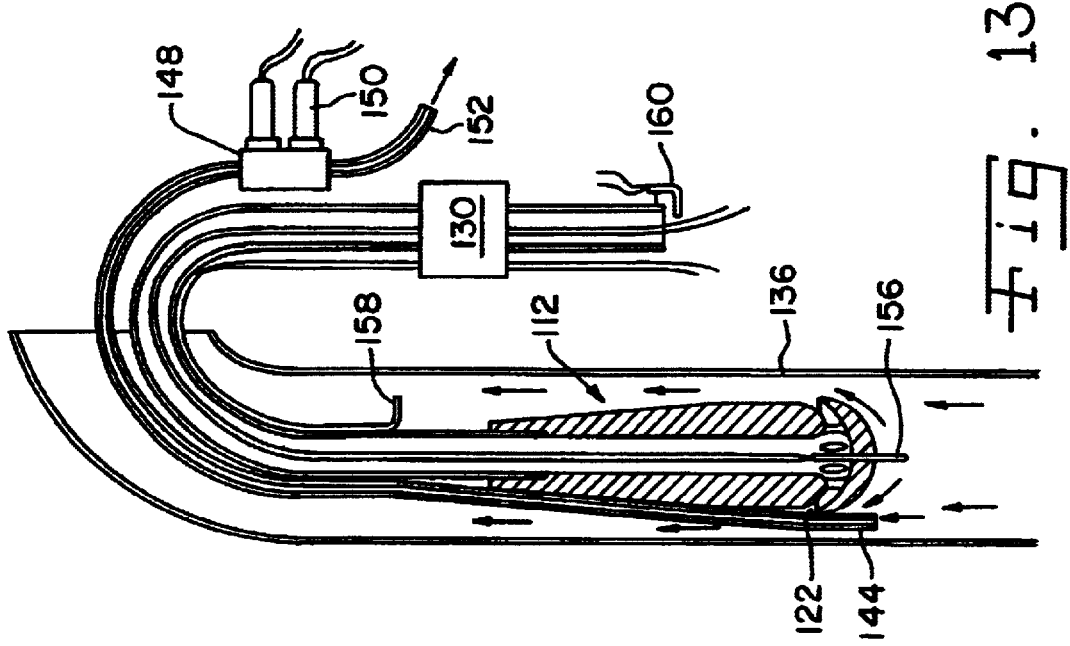
FIG. 13 is a side, sectional view of another embodiment of a gaseous mass flow measurement system of the present invention.

In another embodiment (FIG. 13), module 112 is placed either within exhaust pipe 136 or an add-on module. A portion of the exhaust flow enters exhaust gas sample tube 144 and flows to the gaseous emissions sensor(s) and particulate measurement sensors 148, 150 disposed outside of exhaust pipe 136 in an environment near ambient conditions. The exhaust emissions gaseous sample is acquired upstream of any diluent flow. The diluent is entrained into the hot exhaust downstream of the gaseous emissions sample location. The temperatures of the exhaust gas, mixed gas and diluent are measured by temperature probes 156, 158 and 160, respectively. Temperature probes 156, 158, 160 provide quantitative data for exhaust mass flow, emissions and engine performance measurements.

An enclosure 162 (FIG. 14) collects and analyzes data from the emissions measurement system, and particularly from sensors 130, 150. Enclosure 162 is lightweight, highly mobile, and environmentally sealed. The system contains an emissions sensor control module 164 for the gaseous and particulate sensors disposed on the power plant exhaust stack. Emissions control module 164 controls and provides diagnostics for emissions sensors 130, 150. Control module 164 also provides either an analog, digital or data link output to a data acquisition and storage module 166. The overall processing and function of the measurement systems is controlled via a custom-designed, user-configurable, state-of-the-art microprocessor system 168. Microprocessor 168 calculates the rate of flow of exhaust 34 in the pipe based upon the flow of ambient air into the pipe and/or the temperatures of the ambient air, exhaust 34, and the combination of exhaust 34 and ambient air. Once data has been acquired and stored, it may be accessed via the serial communications port on the data logger or remotely via a cellular modem system 170. Cellular modem 170 provides remote access to the data as well as remote diagnostic capability. Atmospheric conditions such as ambient pressure, ambient humidity and ambient temperature are measured with an enclosure-contained sensor module 172. Test article location data, such as longitude, latitude, altitude and speed, is acquired with an on-board global positioning system 174. All electrical connections 176 are external to the mobile measurement system.

A power plant/engine test article 178 (FIG. 15) includes a hot wire anemometer 180 for measuring engine intake air. A rotational speed pick-up 182 measures the engine speed. The output of pick-up 182 is filtered and provided to data acquisition and storage system 166.

In another embodiment (FIG. 16), the exhaust gases travel vertically upward through stack tube 32 where they impinge on a probe 184. The tear drop shape of probe 184 provides the highest degree of stagnation pressure at location 186 adjacent to the bottom of probe 184 while also creating the most pressure recovery in a tapered region 188. Placing probe 184 into exhaust pipe 32 generates a maximum static pressure at location 186 whilst maintaining a minimum backpressure in region 190. Due to the increased pressure differential between location 186 and the atmospheric pressure at an outlet 192 of a transfer sample tube 194, this process is much more effective than simply placing an exhaust sampling probe into the stack. This pressure differential can also be achieved by placing a standard sampling tube in the stack and restricting the exhaust outlet from the stack. However, the resultant static backpressure upstream of the sampling tube and thus at the engine turbocharger outlet or exhaust manifold (for non-turbocharged engines) would be much greater than that generated with the differential pressure from the use of probe 184.

Stated another way, the exhaust gas travels with significant velocity (depending on the instantaneous engine operation condition) through exhaust pipe 32 where it impinges upon the hemispherically-shaped probe 184. The bottom of probe 184 is in the shape of a hemisphere, i.e., probe 184 is hemispherically-shaped. Due to the decreasing cross-sectional area through which the exhaust gas must travel in region 196, the velocity of the gas increases. Described by Bernoulli's equation, where the velocity at location 186 approaches zero, the pressure is greatest. As the gas accelerates through region 196, it decompresses into region 188. If the shape of the teardrop interruption device 184 is similar to that shown in FIG. 16 and its surface is smooth without sharp obstructions, the static pressure in region 190 is minimized. Because the differential pressure between location 186 and outlet 192 is maximized, the flow of the exhaust gas through tube 194 is also maximized for a given exhaust flow rate and resultant exhaust backpressure upstream of probe 184.

FIG. 17 illustrates an embodiment similar to FIG. 16 with the addition of a sampling system 198 at outlet 192 of transfer tube 194. A sample of the exhaust gas is captured by and transported through tube 194 to outlet 192 of tube 194. Outlet 192 is disposed at the opening of a conically-shaped or hemispherically-shaped end 200 of a tube 202. The cross-sectional area of tube outlet 192 is only a fraction of the cross-sectional area of the opening of end 200 of collecting tube 202. A device such as a pump, eductor, ejector or other type of gas fluid impelling device is contained within a housing structure 204, and draws ambient, filtered and/or conditioned air or other diluent fluid into tube 202. This diluent fluid mixes with the exhaust flow from outlet 192 of transfer tube 194 as the two fluids travel and mix through mixing tube 202. The mixed fluid flows into the measurement device contained within housing structure 204.

Measurement devices may also be contained within housing structure 204, and can be one of, or a combination of, many emissions measurement devices including, but not limited to gaseous single component analyzers such as for carbon monoxide, nitrogen oxide or carbon dioxide, to name a few, multi-gas analyzers such as an FTIR or mass spectrometric based analyzer, or a particulate measurement device such as a particulate patch or oscillating microbalance type device. The measurement device(s) that are contained within housing structure 204 may contain a mass flow controller in association with the pump or impeller such that the overall flow of the exhaust plus diluent fluid can be controlled.

The particulate measurement device within housing structure 204 is an oscillating microbalance based device that continuously measures the mass of particulate matter on an integral filter element. A flow controller maintains a constant flow across the filter—thus simulating the requirements of a Constant Volume Sampling (CVS) system. By selecting a particular flow, and by designing the balance of the interrupting device in the exhaust correctly, a known range of dilution ratios can be predicted for a given engine/vehicle.

After the gas interacts with the measurement device contained within housing structure 204, the diluted flow exits through an outlet 206 of tube 208.

Figure 18:
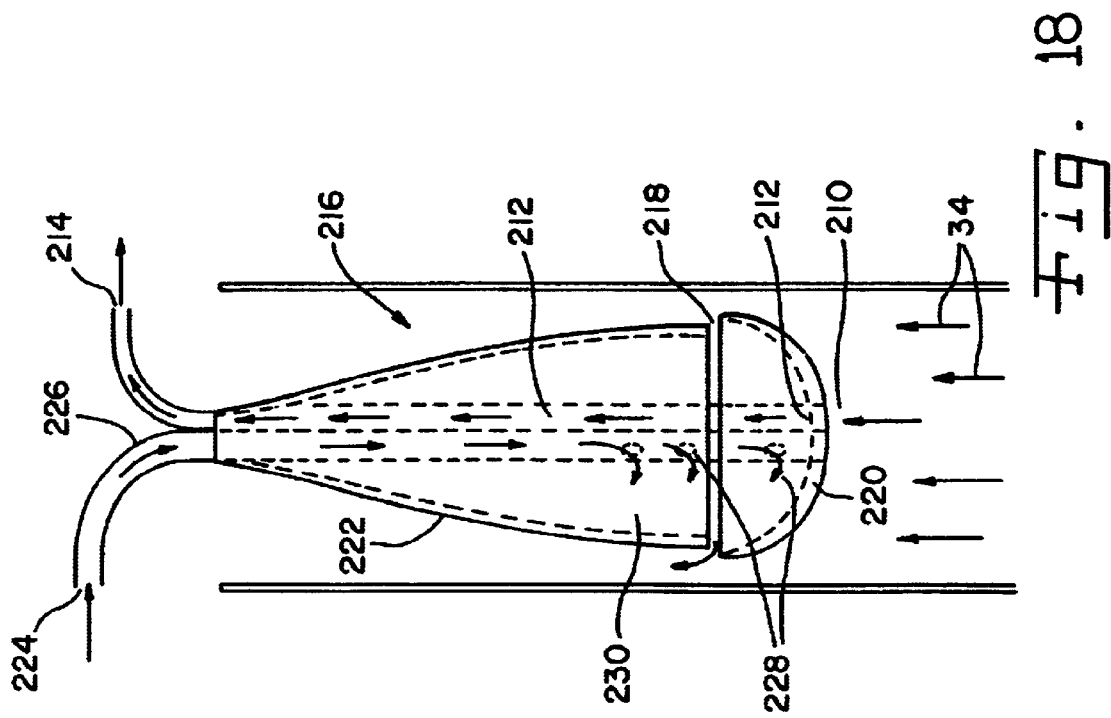
FIG. 18 is a side, sectional view of another embodiment of a gaseous mass flow measurement module of the present invention disposed within an exhaust pipe.

Another embodiment of the present invention is illustrated in FIG. 18. A stagnation point 210 results in the above-described high pressure zone from which the flow of exhaust gas 34 traverses into tube 212. Further conveyance of gas 34 continues through tube 212 and exits at a transfer tube outlet 214 into one of a variety of aforementioned devices. The generally teardrop-shape of interrupter module 216 is consistent with that shown in FIGS. 16 and 17, and therefore backpressure is minimized. A circular annulus 218 encompasses the circumference of the lower part of the teardrop-shaped module 216. Annulus 218 is disposed at the transition point above a hemispherically-shaped portion 220 and below a conical reducer 222 (pressure recovery zone).

When exhaust or another gas 34 is flowing with sufficient velocity (more than 0), the pressure at annulus 218 is reduced and can be significantly below atmospheric pressure. When this occurs, another gas, which can be air, filtered and/or conditioned air or any other gas or gases, is/are introduced into a tube opening 224. This flow continues through a transfer tube 226 into lower portion 220. Holes 228 in tube 226 allow for the in-rushing gas to flow into an inner cavity 230 of the predominantly hollow module 216. The gas then flows through the low pressure region 218 where it is entrained into exhaust flow 34. This mass flow of gas into tube opening 224 is proportional to the mass flow of the exhaust or other gas 34. Thus, through the measurement of the mass flow into tube 224, the flow of gas 34 can be determined via a mathematical relationship therebetween.

In another embodiment (FIG. 19), the exhaust gases travel vertically upward through stack pipe 34. A portion of the exhaust flow enters the lower end of the flow measurement device cylindrical housing 230, where a portion of the exhaust flow impinges upon the hemispherical probe end 232. The hemispherical probe end 232 has an open hole 234 that serves as a sample port into a sample tube 235. Alternatively, hemispherical probe end 232 can be continuous without any hole. Tear drop-shaped probe 236 maximizes stagnation pressure at hemispherical probe end 232, while also maximizing pressure recovery in the tapered region downstream.

The reduced pressure region created by accelerating the exhaust gas around the hemispherical probe end 232 creates a flow of ambient air through an ambient air supply tube 238 at a tube inlet 240. The ambient air then travels across a hot wire anemometer 242 down into tear drop-shaped probe 236 via supply tube passage 244 and out through hole(s) 246 to combine with the exhaust as it flows through flow measurement device cylindrical housing 230.

Tear drop-shaped probe 236 is mechanically attached to ambient air supply tube 238 and the end of supply tube 238 is mechanically attached to hemispherical probe end 232. The tear drop-shaped assembly is then mechanically attached to outer cylindrical housing 230 by upper struts 248 and lower struts 250. The mechanical attachment points may be created by welding. The total gaseous mass flow rate measurement assembly is installed within exhaust pipe 34 with hemispherical end 232 orthogonal to the total exhaust flow. An advantage of this system is that the flow rate measurement accuracy does not change with the position of the flow measurement assembly relative to the centerline of exhaust pipe 34. The system can be easily installed on exhaust pipes with either a straight exit or a curved exit.

Another embodiment is shown in FIG. 20. This gaseous mass flow rate system is based on the same functionality as described with reference to FIG. 19. A hemispherical end 252 facing the flow is a continuous surface without an exhaust sample port. This system configuration is utilized in a system where mass flow rate measurement was required without the need for additional sample analysis.

Figure 19:
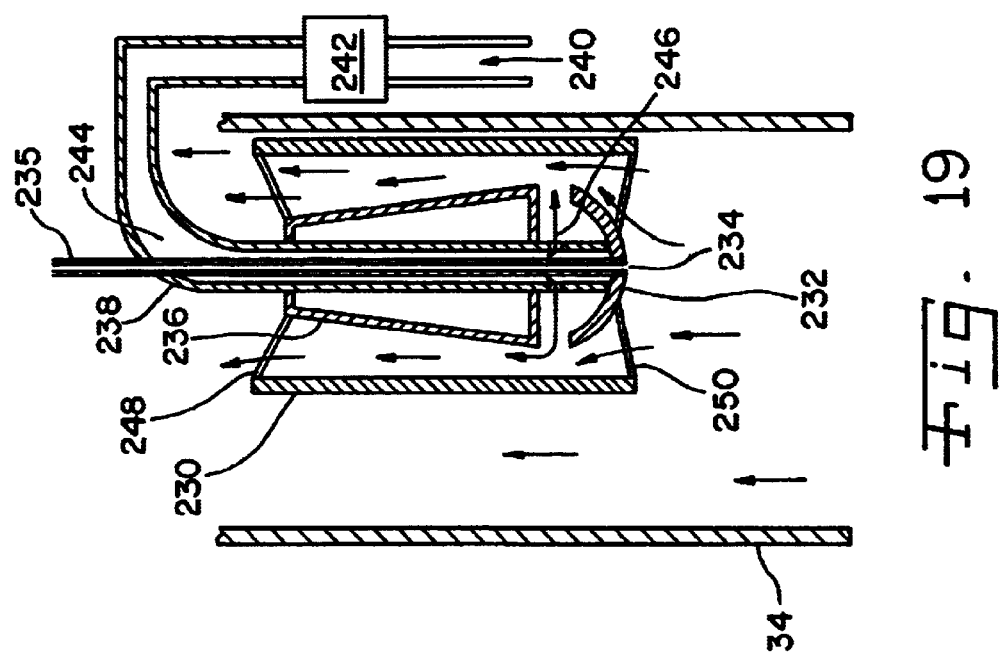
FIG. 19 is a side, sectional view of another embodiment of a gaseous mass flow measurement system of the present invention disposed within an exhaust pipe.

FIG. 21 is an enlarged flow diagram of the embodiment of FIG. 19, illustrating the different flow streams as they travel through and past the flow measurement system. Total exhaust gas flow 34 travels upward through the pipe. A portion 254 of exhaust flow 34 flows around cylindrical flow measurement housing 230. As a remaining portion of exhaust flow 34 enters cylindrical flow measurement housing 230, it impinges upon hemispherical end 232 and a majority 256 of the remaining portion is accelerated around hemispherical end 232, while a minority 258 of the remaining portion travels into sample port entrance 234 and up through sample tube 235. A flow of fresh ambient air 260 is drawn into flow measurement housing 230 by the low pressure region created when flow 256 is accelerated around hemispherical end 232 and pressure is recovered by a flow 262 on the downstream side of tear drop-shaped probe 236. This fresh ambient air flow 260 is measured with a hot wire anemometer prior to entering center tube 238 in probe 236. The total exhaust flow 34 through the pipe can then be calculated based on a correlation between the measured fresh air flow rate and total exhaust pipe flow rate.

Figure 23:
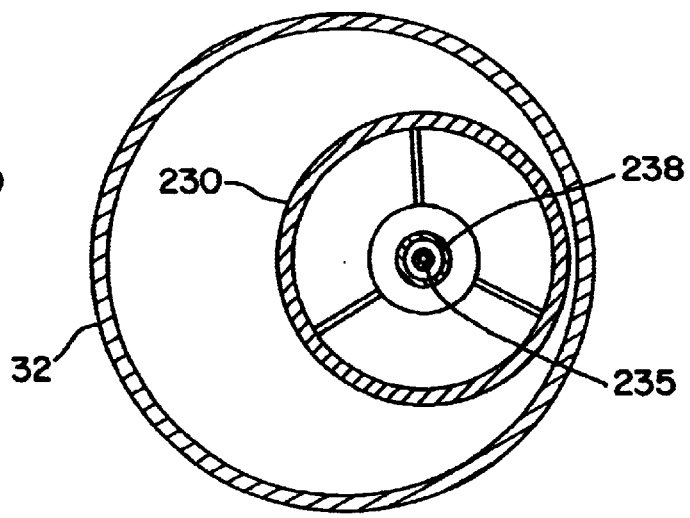
FIG. 23 is a sectional view of the gaseous mass flow measurement module of FIG. 22 along line 23—23.
Figure 22:
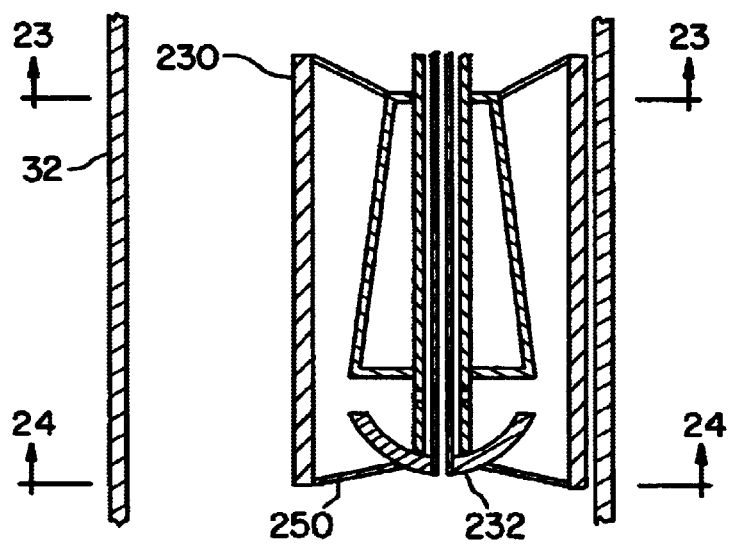
FIG. 22 is a fragmentary, side, section view of the gaseous mass flow measurement module of FIG. 19.
Figure 24:
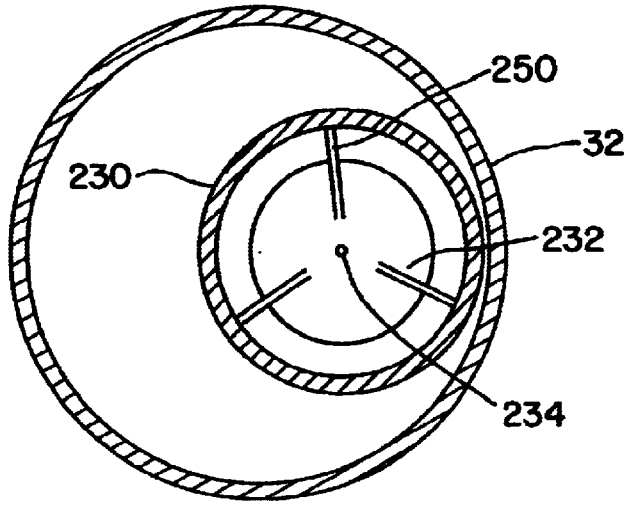
FIG. 24 is a sectional view of the gaseous mass flow measurement module of FIG. 22 along line 24—24.

FIG. 22 is a fragmentary view of the assembly of FIG. 19. FIGS. 23 and 24 are sectional views of FIG. 22. The reference numbers correspond to those of FIG. 19, with exhaust pipe 32 shown to contain cylindrical flow measurement housing 230.

Figure 25:
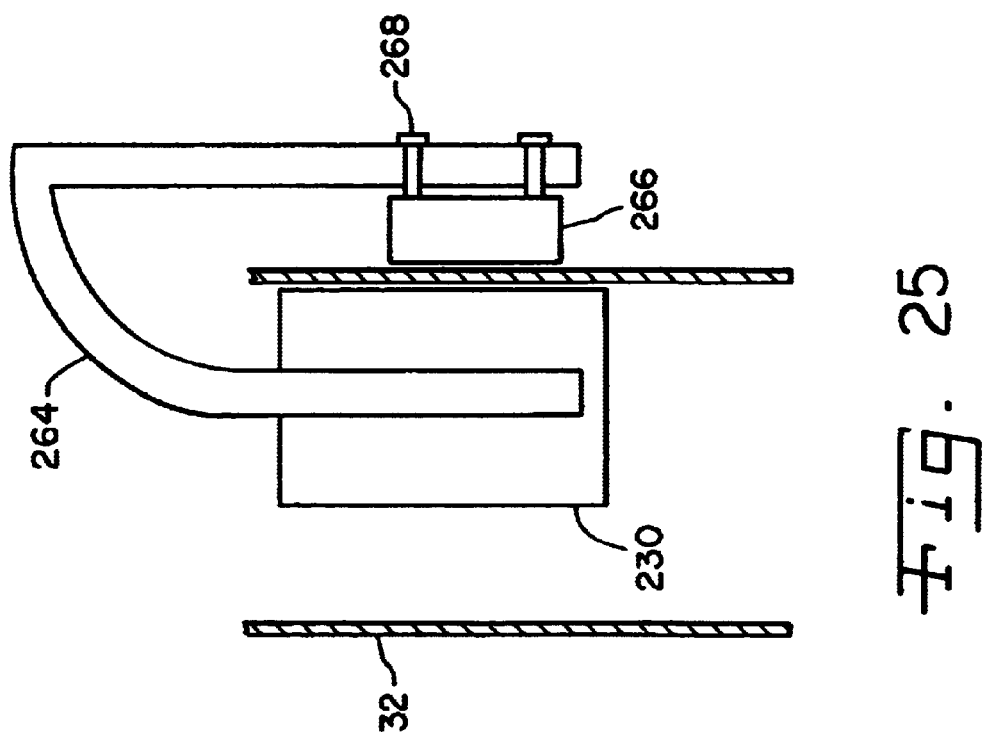
FIG. 25 is a side, sectional view of one embodiment of a mounting device of the present invention attaching a cylindrical housing to an exhaust pipe.

One embodiment of a mounting device is shown in FIG. 25. Exhaust pipe 32 contains the flow measurement system within cylindrical flow measurement system housing 230. A bracket 264 is mechanically attached to cylindrical housing 230 by welding or some type of rigid attachment mechanism. Bracket 264 is shaped so that a portion of bracket 264 is outside of exhaust pipe 32 while the flow measurement system is positioned inside exhaust pipe 32. Bracket 264 straddles a wall of pipe 32 at the exit of pipe 32 and attaches housing 230 to pipe 32.

A spacer 266 is placed flush with the exterior of exhaust pipe 32 on the inside of bracket 264. Spacer 266 has a C-shaped cross section when viewed from the top to conform and adhere better to the circular outer surface of pipe 32.

Mechanical fasteners 268, such as bolts, hold the entire flow measurement assembly rigidly within exhaust pipe 32 by clamping the flow measurement assembly to exhaust pipe 32 with spacer 266 to hold the assembly in position. Several different mounting devices may be employed with this flow measurement and exhaust sampling system. A great advantage of this system is the ability to place the cylindrical measurement housing in any radial position within the exhaust stack. The total exhaust flow measurement is independent of placement within the stack because the low pressure region that draws the fresh airflow is created by the geometric configuration between the tear drop shaped probe, hemispherical end, and cylindrical measurement system housing.

Figure 26:
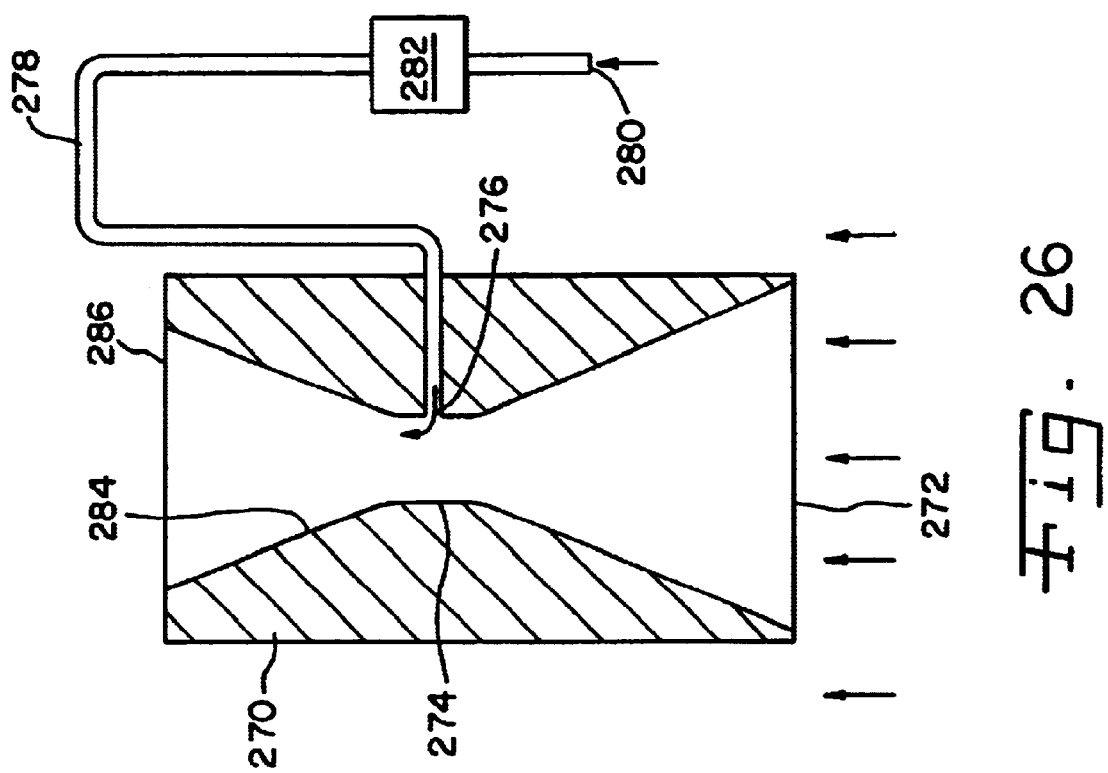
FIG. 26 is a side, section view of one embodiment of a venturi of the present invention.

FIG. 26 depicts a cross-sectional view of a venturi with integrated ambient flow. A venturi 270 is inserted into the exhaust gas stream, which is flowing in the direction shown by the arrows. A portion or all of the exhaust gas stream flows into the venturi at a device entrance 272. The exhaust gas static pressure is reduced at a throat 274 due to the smaller cross-sectional area and higher flow velocity. Fresh ambient air is drawn into throat entrance 276 through a feed tube 278 and at tube entrance 280. The fresh air flow rate is measured with a hot wire anemometer 282. The pressure of the exhaust gas is recovered on a downstream side 284 of throat 274. The combined fresh ambient air flow and exhaust combines and travels out of venturi 270 at exit 286. The device is calibrated such that the measured fresh air flow corresponds to the exhaust flow through a mathematical relationship.

The venturi assembly has an annular manifold or chamber 88 (FIG. 5) at venturi throat 274. Annular chamber 88 provides a more even distribution of fresh ambient air flow into the throat area and can reduce the pressure loss caused by entrainment. An exhaust sampling probe 98 is inserted into the flow prior to the entrainment of the fresh ambient flow. Sample probe 98 can be configured with analyzers 100 to measure gaseous species concentrations, such as $CO_2$, NO, $NO_2$, particulate matter, and hydrocarbons.

FIG. 27 depicts a venturi measurement assembly system configured for full exhaust flow. The system is inserted into exhaust pipe 32 and all of the engine exhaust travels through the venturi.

FIG. 25 depicts a partial exhaust flow venturi system in a straight-out configured exhaust stack 32. The venturi measurement assembly within housing 230 is attached to a holding bracket 264. Holding bracket 264 with the venturi measurement assembly is inserted into the exhaust flow stream. The assembly is held rigidly in position within the exhaust stack by tightening mechanical fasteners 268 to a spacer 266 and clamping down to exhaust stack 32. The venturi measurement assembly could be configured in the manner shown in FIGS. 5 and 26.

FIG. 28 depicts a partial exhaust flow venturi system in a curved end exhaust stack system, such as typically installed on a class 8 semi-truck. Curved exhaust stack 136 contains the entire assembly described in the description for FIG. 25. The advantage to mounting bracket 264 is that this exhaust flow device can be easily used on numerous sizes and types of exhaust stacks with the same hardware components. The system would simply need to be calibrated for the corresponding fresh air flow rate to exhaust flow rate, depending on the stack diameter.

Figure 29:
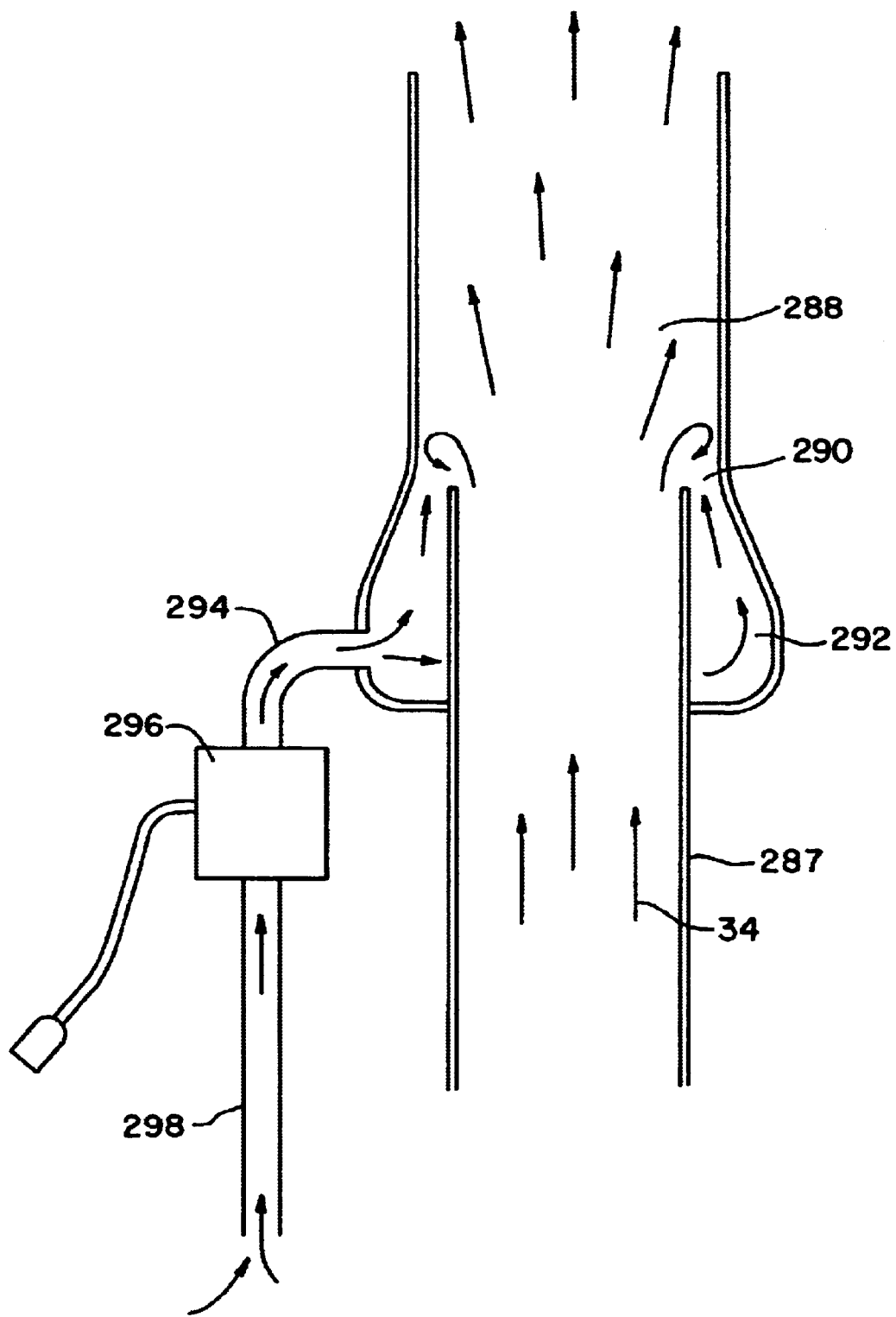
FIG. 29 is a side, sectional view of another embodiment of a gaseous mass flow measurement system of the present invention.

In another embodiment (FIG. 29), exhaust gases 34 flow through pipe 287 and into an expansion region 288 having a larger cross-sectional area than pipe 287. This causes a low pressure region to form at the manifold opening 290, which results in a flow of diluent gas from manifold 292. The diluent gas is entrained into exhaust flow 34 in expansion region 288. The diluent gas flows into manifold 292 from tube 294, flow measurement device 296, and tube 298.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of determining a rate of flow of an exhaust gas in a pipe, said method comprising the steps of:
    providing the pipe with a first channel section and a second channel section downstream from said first channel section, said first channel section having a first cross-sectional area, said second channel section having a second cross-sectional area smaller than said first cross-sectional area, said second channel section defining a pressure drop section relative to the exhaust gas;
    providing a source of ambient air in fluid communication with said second channel section;
    measuring a characteristic of a flow of the ambient air into said second channel section; and
    calculating the rate of flow of the exhaust gas in the pipe based at least partially upon the characteristic of the flow of the ambient air into the second channel section.

2. The method of claim 1, wherein said step of providing the pipe with a first channel section and a second channel section includes placing a flow-restricting device in the pipe, said flow-restricting device defining said pressure drop section.

3. The method of claim 2, wherein said flow-restricting device comprises a venturi.

4. The method of claim 2, wherein said flow-restricting device is teardrop-shaped.

5. The method of claim 2, wherein said source of ambient air is in fluid communication with said second channel section through an annular opening in said flow-restricting device.

6. The method of claim 2, wherein said flow-restricting device includes a housing tube substantially surrounding a module, said housing tube and said module defining each of said first channel section and said second channel section therebetween.

7. The method of claim 1, wherein said characteristic of the flow of the ambient air comprises a rate of flow of the ambient air into said second channel section.

8. The method of claim 1, wherein said characteristic of the flow of the ambient sir comprises a temperature of the flow of the ambient air.

9. The method of claim 8, wherein said calculating step is based on a temperature of the exhaust gas upstream of said second channel section and a temperature of a mixture of the exhaust gas and the ambient air downstream of said second channel section.

10. The method of claim 1, wherein the flow of the ambient air is entrained in the flow of the exhaust gas in the second channel section.

11. The method of claim 1, wherein said second cross-sectional area is less than said first cross-sectional area.

12. The method of claim 11, comprising the further step of utilizing low pressure created by an increased flow velocity in said second channel section to draw the ambient air into said second channel section.

13. A method of determining a rate of flow of an exhaust gas in a pipe, said method comprising the steps of:
    placing a flow-restricting device in the pipe such that at least one of said device and the pipe define a first channel section and a second channel section, said second channel section being disposed downstream from said first channel section, said first channel section having a first crass-sectional area, said second channel section having a second cross-sectional area less than the first cross-sectional area, said second channel section defining a pressure drop section relative to the exhaust gas;

providing a source of ambient air in fluid communication with said second channel section;

measuring a rate of a flow of the ambient air into said second channel section;

ascertaining a mathematical relationship between the rate of the flow of the ambient air into the second channel section and the rate of flow of the exhaust gas in the pipe; and calculating the rate of flow of the exhaust gas in the pipe based at least partially upon the rate of flow of the ambient air into the second channel section and the ascertained mathematical relationship.

14. The method of claim 13, wherein said flow-restricting device comprises a venturi.

15. The method of claim 13, wherein said flow-restricting device is teardrop-shaped.

16. The method of claim 13, wherein said source of ambient air is in fluid communication wit said second channel section through said flow-restricting device.

17. The method of claim 13, wherein the flow of the ambient air is entrained in the flow of the exhaust gas into second channel section.

18. The method of claim 13, wherein said flow restricting device includes an annulus opening between said first channel and said second channel.

19. The method of claim 13, wherein said flow-restricting device includes a housing tube substantially surrounding a module, said housing tube and said module defining each of said first channel section and said second channel section therebetween.

20. The method of claim 13, wherein said second cross-sectional area is less than said first cross-sectional area.

21. The method of claim 20, comprising the further step of utilizing low pressure created by an increased flow velocity in said second channel section to draw the ambient air into said second channel section.

22. An apparatus for determining a rate of flow of an exhaust gas in a pipe, said apparatus comprising:

a flow-restricting device configured for being placed in to pipe such that at least one of said device and the pipe define a first channel section and a second channel section, said second channel section being disposed downstream from said first channel section, said first channel section having a first cross-sectional area, said second channel section having a second cross-sectional area less than the first cross-sectional area, said second channel section defining a pressure drop section relative to the exhaust gas;

a source of ambient air in fluid communication with said second channel section;

a measuring device configured for measuring a characteristic of a flow of the ambient air into said second channel section; and a processor configured for calculating the rate of flow of the exhaust gas in the pipe based at least partially upon the measured characteristic of the flow of the ambient air into said second channel section.

23. The apparatus of claim 22, wherein said flow-restricting device comprises a venturi.

24. The apparatus of claim 22, wherein said flow-restricting device is teardrop-shaped.

25. The apparatus of claim 22, wherein a space between said first channel section and said second channel section defines an annulus opening, said source of ambient air being in fluid communication with said first channel section by way of said annulus opening.

26. The apparatus of claim 22, wherein said characteristic of the flow of the ambient air comprises a rate of flow of the ambient air into said second channel section.

27. The apparatus of claim 22, wherein said measuring device comprises an anemometer.

28. The apparatus of claim 22, wherein said characteristic of the flow of the ambient air comprises a temperature of the flow of the ambient air.

29. The apparatus of claim 28, wherein said processor is configured for calculating the rate of flow of the exhaust gas in the pipe based at least partially upon a temperature of the exhaust gas upstream of said second channel section and a temperature of a mixture of the exhaust gas and the ambient air downstream of said second channel section.

30. The apparatus of claim 22, wherein the flow of the ambient air is entrained in the flow of the exhaust gas in the second channel section.

31. The apparatus of claim 22, wherein said flow-restricting device includes a manifold fluidly connecting said second channel section and said source of ambient air.

32. The apparatus of claim 22, wherein said flow-restricting device includes a central tube fluidly connecting said manifold and said source of ambient air.

33. The apparatus of claim 32, wherein said tube extends out of an exit of the pipe.

34. The apparatus of claim 22, wherein said flow-restricting device includes a housing tube substantially surrounding a module, said housing tube and said module defining each of said first channel section and said second channel section therebetween.

35. The apparatus of claim 34, wherein said flow-restricting device includes a plurality of struts interconnecting said housing tube and said module.

36. The apparatus of claim 22, wherein said flow-restricting device includes a sampling tube extending out of an exit of the pipe, said sampling tube being configured for capturing a sample of the exhaust gas.

37. The apparatus of claim 22, further comprising a bracket configured for straddling a wall of the pipe at an exit of the pipe and attaching said flow-restricting device to the pipe.

38. The apparatus of claim 22, wherein said second cross-sectional area is less than said first cross-sectional area.

39. The apparatus of claim 38, wherein said flow-restricting device is configured for utilizing low pressure created by an increased flow velocity in said second channel section to draw the ambient air into said second channel section.

40. The apparatus of claim 22, wherein said flow-restricting device is configured to be removably placed in the pipe.

* * * * *